US012755277B2

(12) United States Patent
Adachi et al.

(10) Patent No.: US 12,755,277 B2
(45) **Date of Patent: *Oct. 6, 2026**

(54) AUTHENTICATION-GAINING APPARATUS, AUTHENTICATION APPARATUS, AUTHENTICATION REQUEST TRANSMITTING METHOD, AUTHENTICATION METHOD, AND PROGRAM

(71) Applicant: Sinumy Corporation, Osaka (JP)

(72) Inventors: Yasuhiko Adachi, Osaka (JP); Takanori Isobe, Osaka (JP)

(73) Assignee: Sinumy Corporation, Osaka (JP)

( * ) Notice: Subject to any disclaimer, the term of this patent is extended or adjusted under 35 U.S.C. 154(b) by 346 days.

This patent is subject to a terminal disclaimer.

(21) Appl. No.: 17/996,255

(22) PCT Filed: Apr. 13, 2021

(86) PCT No.: PCT/JP2021/015361
§ 371 (c)(1),
(2) Date: Jan. 23, 2023

(87) PCT Pub. No.: WO2021/210591
PCT Pub. Date: Oct. 21, 2021

(65) Prior Publication Data
US 2023/0162184 A1 May 25, 2023

(30) Foreign Application Priority Data
Apr. 14, 2020 (JP) ................................ 2020-087025

(51) Int. Cl.
*G06Q 20/38* (2012.01)
*G06F 21/36* (2013.01)
(Continued)

(52) U.S. Cl.
CPC ......... *G06Q 20/3829* (2013.01); *G06F 21/36* (2013.01); *G06Q 20/4014* (2013.01);
(Continued)

(58) Field of Classification Search
CPC .......... G06Q 20/3829; G06Q 20/4014; G06Q 20/4016; H04L 63/08; G06F 21/36
(Continued)

(56) References Cited

U.S. PATENT DOCUMENTS

2008/0126804 A1* 5/2008 Zhang .................. H04L 9/3273 713/169
2009/0183246 A1* 7/2009 Kokologiannakis .... G06F 21/31 726/7
(Continued)

FOREIGN PATENT DOCUMENTS

EP 1926335 A1 5/2008
JP H02151891 A 6/1990
(Continued)

OTHER PUBLICATIONS

Notice of Reasons for Refusal from corresponding Japanese Application No. JP2022-164251 with Machine translation dated Aug. 22, 2023.
(Continued)

*Primary Examiner* — Dant B Shaifer Harriman
(74) *Attorney, Agent, or Firm* — Troutman Pepper Locke LLP

(57) ABSTRACT

An authentication-gaining apparatus includes: an acquiring unit that acquires unique information; an encrypting unit that encrypts the unique information using a cryptographic key, thereby generating encrypted information; and a display unit that repeatedly transmits an authentication request containing the encrypted information, to an authentication apparatus, during an authentication period, wherein multiple
(Continued)

authentication requests respectively containing encrypted information obtained by encrypting different pieces of unique information are transmitted during the authentication period. An authentication apparatus includes: a receiving unit that repeatedly receives an authentication request transmitted from an authentication-gaining apparatus, during an authentication period; a decrypting unit that decrypts the encrypted information, thereby acquiring decrypted information; an authentication unit that judges whether or not the authentication-gaining apparatus is legitimate, using multiple authentication requests received during the authentication period and containing encrypted information that has been decrypted; and an output unit that outputs a judgment result by the authentication unit.

9 Claims, 10 Drawing Sheets

(51) Int. Cl.
*G06Q 20/40* (2012.01)
*H04L 9/40* (2022.01)

(52) U.S. Cl.
CPC ..... *G06Q 20/4016* (2013.01); *H04L 63/0428* (2013.01); *H04L 63/08* (2013.01)

(58) Field of Classification Search
USPC .......................................................... 380/234
See application file for complete search history.

(56) References Cited

U.S. PATENT DOCUMENTS

| | | | | |
|---|---|---|---|---|
| 2010/0197271 | A1* | 8/2010 | Yoshikawa | H04L 63/0492 713/168 |
| 2013/0226819 | A1 | 8/2013 | Rong et al. | |
| 2014/0200924 | A1* | 7/2014 | Gilbert | G06Q 10/10 705/3 |
| 2016/0188859 | A1* | 6/2016 | Lee | G06F 21/32 726/18 |
| 2016/0255078 | A1* | 9/2016 | Zhang | G06F 21/36 726/4 |
| 2018/0047011 | A1 | 2/2018 | Pedersoli | |
| 2018/0167784 | A1* | 6/2018 | Sute | H04W 4/023 |
| 2019/0294775 | A1 | 9/2019 | Okabe | |
| 2020/0097948 | A1 | 3/2020 | Sheets et al. | |
| 2021/0044976 | A1* | 2/2021 | Avetisov | H04W 12/08 |

FOREIGN PATENT DOCUMENTS

| | | | |
|---|---|---|---|
| JP | 2000076411 | A | 3/2000 |
| JP | 2001265731 | A | 9/2001 |
| JP | 2003242116 | A | 8/2003 |
| JP | 2005182295 | A | 7/2005 |
| JP | 2005292908 | A | 10/2005 |
| JP | 2008259183 | A | 10/2008 |
| JP | 4998065 | B | 8/2012 |
| JP | 2013-171496 | A | 9/2013 |
| JP | 2015511738 | A | 4/2015 |
| JP | 5784813 | B | 9/2015 |
| JP | 2016136665 | A | 7/2016 |
| JP | 2016162094 | A | 9/2016 |
| JP | 2018055149 | A | 4/2018 |
| JP | 2018106645 | A | 7/2018 |
| JP | 2019168961 | A | 10/2019 |
| WO | 2007/026745 | A1 | 3/2007 |
| WO | 2020/080301 | A1 | 4/2020 |

OTHER PUBLICATIONS

Extended European Search Report & Search Opinion dated May 22, 2024, from corresponding European Application No. 21787961.8.
English translation of International Search Report & Written Opinon dated Jul. 20, 2022 from Corresponding application No. PCT/JP2021/015361.
Notice of Reasons for Refusal from corresponding application No. P2020-087025 with English translation dated Sep. 13, 2022.

* cited by examiner

AUTHENTICATION-GAINING APPARATUS, AUTHENTICATION APPARATUS, AUTHENTICATION REQUEST TRANSMITTING METHOD, AUTHENTICATION METHOD, AND PROGRAM

CROSS REFERENCE TO RELATED APPLICATIONS

This is a U.S. National Phase application under 35 U.S.C. § 371 of International Patent Application No. PCT/JP2021/015361, Filed Apr. 13, 2021, which claims priority of Japanese Patent Application No. 2020-087025, filed Apr. 14, 2020, each of which is hereby incorporated by reference in its entirety.

FIELD OF THE INVENTION

The present invention relates to an authentication-gaining apparatus, an authentication apparatus, an authentication request transmitting method, an authentication method, and a program.

BACKGROUND

Conventionally, systems are known with which authentication can be performed using personal mobile terminals such as smartphones and payment can be made using two-dimensional barcodes or the like. With such systems, users can make payment for products, services, and the like using their personal mobile terminals. According to conventional payment methods using two-dimensional barcodes, a two-dimensional barcode itself is valid for about five minutes and can be easily duplicated and misused for spoofing and the like, and thus challenge-response authentication (see Japanese Patent No. 4998065, for example) and methods in which a two-dimensional barcode changes over time are being considered (see Japanese Patent No. 5784813, for example).

However, although challenge-response authentication is more secure, it is time-consuming and therefore less convenient. Also, methods in which a two-dimensional barcode changes over time have maintained convenience, but "Solution to Problem" in Japanese Patent No. 5784813 is to display a two-dimensional barcode over time for a short period of time, and thus the two-dimensional barcode can be easily duplicated and abused as a moving image during the period in which the barcode that changes over time is valid, that is, it is not a solution after all.

In such authentication, in order to improve the usability for users and reduce the processing load, there is a demand for making it possible to perform authentication through simpler processing, that is, a demand for convenience. Meanwhile, there is also a demand for making it possible to realize secure authentication by preventing spoofing and the like, that is, a demand for security at the same time.

The present invention was arrived at in order to solve the above-described problems, and it is an object thereof to provide an authentication-gaining apparatus, an authentication request transmitting method, an authentication method, and a program with which secure authentication with high safety and convenience can be realized through simple processing.

SUMMARY

In order to achieve the above-described object, the present invention is directed to an authentication-gaining apparatus including: an acquiring unit that acquires unique information; an encrypting unit that encrypts the unique information using a cryptographic key, thereby generating encrypted information; and a display unit that repeatedly transmits an authentication request containing the encrypted information, to an authentication apparatus, during an authentication period, wherein multiple authentication requests respectively containing encrypted information obtained by encrypting different pieces of unique information are transmitted during the authentication period.

With this configuration, it is possible to transmit multiple authentication requests respectively containing encrypted information obtained by encrypting different pieces of unique information, to the authentication apparatus. Thus, it is possible to realize secure authentication through simple processing in the authentication apparatus, using the multiple authentication requests.

Furthermore, the authentication-gaining apparatus according to the present invention may be such that the unique information contains any one of a random number value, a counter value, and time.

With this configuration, it is possible to easily acquire unique information.

Furthermore, the authentication-gaining apparatus according to the present invention may be such that the authentication request is an image.

With this configuration, it is easy to improve security without reducing the convenience of commonly used two-dimensional barcodes and the like.

The present invention is further directed to an authentication apparatus including: a receiving unit that repeatedly receives an authentication request containing encrypted information obtained through encryption using a cryptographic key and transmitted from an authentication-gaining apparatus, during an authentication period; a decrypting unit that decrypts the encrypted information, thereby acquiring decrypted information; an authentication unit that judges whether or not the authentication-gaining apparatus is legitimate, using multiple authentication requests received during the authentication period and containing encrypted information that has been decrypted; and an output unit that outputs a judgment result by the authentication unit, wherein the authentication-gaining apparatus that is legitimate transmits multiple authentication requests respectively containing encrypted information obtained by encrypting different pieces of unique information, during the authentication period.

With this configuration, it is possible to judge whether or not an authentication-gaining apparatus is legitimate, using the multiple authentication requests transmitted from the authentication-gaining apparatus. Accordingly, it is possible to realize secure authentication through simple processing. More specifically, it is judged whether or not the authentication-gaining apparatus is legitimate, using multiple authentication requests, and thus it is possible to realize secure authentication in which spoofing is prevented, even through simple authentication processing.

Furthermore, the authentication apparatus according to the present invention may be such that, if there are a predetermined number or more of duplicates in multiple pieces of decrypted information, the authentication unit judges that the authentication-gaining apparatus is not legitimate.

With this configuration, for example, if an attacker repeatedly transmits one authentication request transmitted from a legitimate authentication-gaining apparatus, it is possible to detect such an event.

Furthermore, the authentication apparatus according to the present invention may be such that, if an authentication request is received more than a predetermined number of times during a predetermined period, the authentication unit judges that the authentication-gaining apparatus is not legitimate.

With this configuration, for example, if an authentication request is transmitted from an attacker's apparatus as well as a legitimate authentication-gaining apparatus, it is possible to detect such an event.

Furthermore, the authentication apparatus according to the present invention may be such that, if authentication request receiving intervals in the authentication period include a receiving interval with a probability that is lower than a threshold, the authentication unit judges that the authentication-gaining apparatus is not legitimate.

With this configuration, for example, if an authentication request is transmitted from an attacker's apparatus as well as a legitimate authentication-gaining apparatus, it is possible to detect such an event.

Furthermore, the authentication apparatus according to the present invention may be such that, if multiple pieces of decrypted information respectively acquired from the multiple authentication requests received during the authentication period do not match the unique information, the authentication unit judges that the authentication-gaining apparatus is not legitimate.

With this configuration, for example, if one authentication request transmitted from a legitimate authentication-gaining apparatus is acquired by an attacker and transmitted to the authentication apparatus, it is possible to detect such an event.

Furthermore, the authentication apparatus according to the present invention may be such that the receiving unit intermittently receives an authentication request.

With this configuration, the load for receiving authentication requests can be reduced, and thus it is possible to reduce the limitations of the specifications of the authentication apparatus.

Furthermore, the authentication apparatus according to the present invention may be such that the authentication request is an image.

With this configuration, it is easy to apply the technique to commonly used cameras and the like.

The present invention is further directed to an authentication request transmitting method including: a step of acquiring unique information; a step of encrypting the unique information using a cryptographic key, thereby generating encrypted information; and a step of repeatedly transmitting an authentication request containing the encrypted information, to an authentication apparatus, during an authentication period, wherein multiple authentication requests respectively containing encrypted information obtained by encrypting different pieces of unique information are transmitted during the authentication period.

The present invention is further directed to an authentication method including: a step of repeatedly receiving an authentication request containing encrypted information obtained through encryption using a cryptographic key and transmitted from an authentication-gaining apparatus, during an authentication period; a step of decrypting the encrypted information, thereby acquiring decrypted information; a step of judging whether or not the authentication-gaining apparatus is legitimate, using multiple authentication requests received during the authentication period and containing encrypted information that has been decrypted; and a step of outputting a judgment result in the step of judging whether or not the authentication-gaining apparatus is legitimate, wherein the authentication-gaining apparatus that is legitimate transmits multiple authentication requests respectively containing encrypted information obtained by encrypting different pieces of unique information, during the authentication period.

With the authentication-gaining apparatus, the authentication apparatus, the authentication request transmitting method, the authentication method, and the program according to the present invention, it is possible to realize secure authentication with high safety and convenience through simple processing.

DETAILED DESCRIPTION

Figure 1:
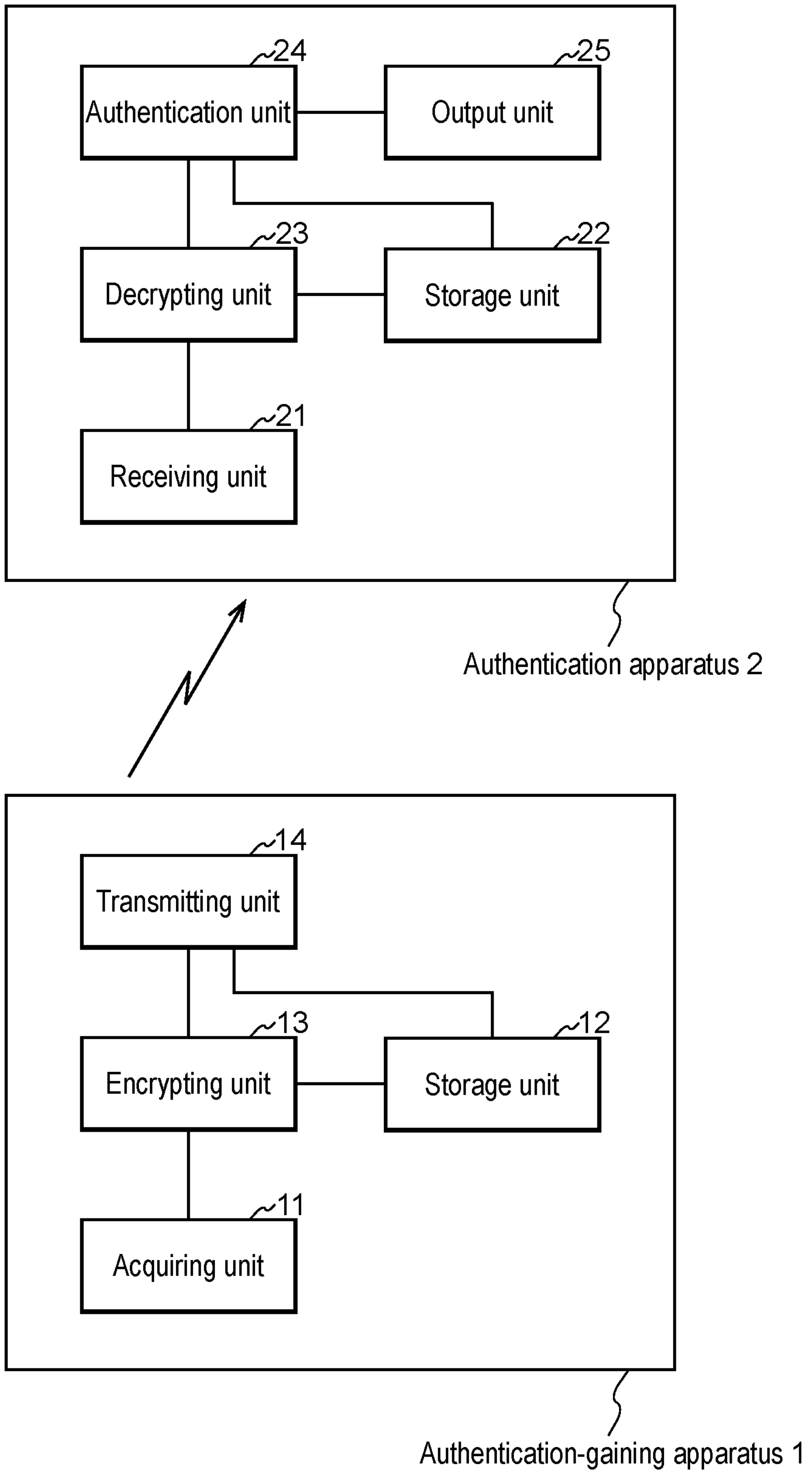
FIG. 1 is a block diagram showing the configuration of an authentication-gaining apparatus and an authentication apparatus according to an embodiment of the present invention.

Hereinafter, an authentication-gaining apparatus, an authentication apparatus, an authentication request transmitting method, and an authentication method according to the present invention will be described based on an embodiment. Note that constituent elements or steps denoted by the same reference numerals are the same as or similar to each other in the following embodiments, and thus a description thereof may not be repeated. The authentication-gaining apparatus according to this embodiment transmits multiple barcode-like identifier-type authentication requests containing encrypted information obtained by encrypting different pieces of unique information, and the authentication apparatus receives the barcode-like identifiers. The authentication apparatus according to this embodiment performs authentication of the authentication-gaining apparatus, using the multiple barcode-like identifier-type authentication requests transmitted from the authentication-gaining apparatus. The barcode-like identifier in this embodiment may be, for example, a two-dimensional code such as a general barcode or a QR code (registered trademark), or information obtained by encoding sequence information of dyes, numbers, letters and/or symbols.

FIG. 1 is a block diagram showing the configuration of an authentication-gaining apparatus 1 and an authentication apparatus 2 according to this embodiment. The authentication-gaining apparatus 1 according to this embodiment includes an acquiring unit 11, a storage unit 12, an encrypting unit 13, and a display unit 14. The authentication apparatus 2 according to this embodiment includes a receiving unit 21, a storage unit 22, a decrypting unit 23, an authentication unit 24, and an output unit 25. For example, the authentication-gaining apparatus 1 may be a portable information terminal having a communication function, such as a smartphone, a tablet terminal, a PDA (personal digital assistant), a laptop, or a transceiver, or may be other devices. For example, the authentication apparatus 2 may be an automatic ticket gate, a gate for entering the venue for an event or the like, an automatic vending machine, a control apparatus for locking and unlocking doors of hotels or rental conference rooms, a cash register, or the like, or may be a portable information terminal having a communication function, such as a smartphone. Even in a configuration that simultaneously detects the barcode-like identifiers of multiple authentication-gaining apparatuses 1, this embodiment will mainly describe a case in which the authentication-gaining apparatus 1 and the authentication apparatus 2 are portable information terminals having a communication function. Although FIG. 1 shows a case in which one authentication-gaining apparatus 1 and one authentication apparatus 2 communicate with each other, there is no limitation to this. It is also possible that multiple authentication-gaining apparatuses 1 and one authentication apparatus 2 communicate with each other. The communication is typically image presentation.

First, the authentication-gaining apparatus 1 according to this embodiment will be described.

The acquiring unit 11 acquires unique information. The unique information may be, for example, each different pieces of information. In this case, if the acquiring unit 11 acquires multiple pieces of unique information, the multiple pieces of unique information are different from each other. As will be described later, the unique information is encrypted, contained in a barcode-like identifier-type authentication request, and transmitted. Accordingly, if the unique information is each different pieces of information, each piece of unique information can be said to be information that is unique to an barcode-like identifier-type authentication request. Typically, information constituted by information that is unique and information that is not unique (e.g., information in which a more significant bit is information that is unique, and a less significant bit is information that is not unique) is eventually unique information. Accordingly, the unique information may be constituted by information that is unique and information that is not unique in this manner. In order to distinguish unique information from information that is unique contained in the unique information, information that is unique contained in the unique information may be hereinafter referred to as a "unique portion". Also, information that is not unique contained in the unique information may be referred to as a "non-unique portion". The non-unique portion is information that cannot always be said to be information that is unique, and may be information that may be different for each barcode-like identifier-type authentication request, as with later-described positional information.

The unique information may contain, for example, a random number value, a count value, time, a one-time password, or other unique information. The random number value may be generated, for example, using a random number table, a function for generating a random number, or the like. The count value may be, for example, a value obtained by incrementing or decrementing a value at predetermined intervals. If the unique information that is different for each barcode-like identifier-type authentication request is used, it is preferable that there is no duplicate in the random number values or the count values. The time may be, for example, time in o'clock, minutes, and seconds, minutes and seconds, or the like acquired from an unshown clock unit. If the unique information that is different for each authentication request is used, it is preferable that the level of precision in the time is a level of precision in time intervals that are shorter than later-described authentication request transmitting intervals. With this configuration, for example, the unique information can be information that is unique to an authentication request. For example, if the authentication request transmitting intervals are approximately 100 milliseconds, the level of precision in the time may be 10 millisecond. If duplicate pieces of unique information are used in multiple authentication requests, there may be duplicates in the random number values or the count values, and the level of precision in the time may be a level of precision in time intervals that are longer than transmitting intervals. Even in such a case, as will be described later, multiple authentication requests corresponding to different pieces of unique information have to be transmitted during an authentication period, and thus it is preferable to acquire unique information with which such multiple authentication requests can be transmitted.

The acquiring unit 11 may generate unique information, or may receive it from other constituent elements or apparatuses. If the unique information is constituted by a unique portion and a non-unique portion, the acquiring unit 11 may acquire a unique portion such as a random number value, a count value, time, or a one-time password, and generate unique information using the unique portion, and a non-unique portion such as an ID of the authentication-gaining apparatus 1 in which that acquiring unit 11 is included, an ID of the authentication apparatus 2 to which the transmission is to be performed, positional information of the authentication-gaining apparatus 1 in which that acquiring unit 11 is included, or the like.

The ID of the authentication-gaining apparatus 1 may be, for example, read from the storage unit 12 and used. The ID of the authentication apparatus 2 to which the transmission is to be performed may be, for example, contained in a later-described transmission instruction, or may be read from the storage unit 12 and used. The positional information of the authentication-gaining apparatus 1 may be acquired by a position acquiring unit, as will be described later. For example, the acquiring unit 11 may receive unique information from the authentication apparatus 2. In that case, an authentication request containing encrypted information obtained by encrypting the unique information is transmitted from the authentication-gaining apparatus 1 to the authentication apparatus 2, so that challenge and response authentication is performed. In this case, this sort of unique information may be generated in the authentication apparatus 2. For example, the acquiring unit 11 may receive a unique portion from the authentication apparatus 2, and generate unique information using the unique portion. Also in this case, challenge and response authentication can be performed using the unique portion contained in the unique information.

For example, an ID of the authentication-gaining apparatus 1 is stored in the storage unit 12. The ID is an identifier of the authentication-gaining apparatus 1, and is information that is unique to the authentication-gaining apparatus 1. For example, a later-described common key, an ID that is an identifier of the authentication apparatus 2, and the like may be stored in the storage unit 12. If the unique information contains a random number value or a count value, a random number table or a function for acquiring a random number value, the latest count value for generating a count value, and the like may be stored in the storage unit 12.

There is no limitation on the procedure in which information is stored in the storage unit 12. For example, information may be stored in the storage unit 12 via a storage medium, information transmitted via a communication line or the like may be stored in the storage unit 12, or information input via an input device may be stored in the storage unit 12. The storage unit 12 is preferably a non-volatile storage medium, but can also be realized by a volatile storage medium. Examples of the storage medium may include a semiconductor memory, a magnetic disk, and an optical disk.

The encrypting unit 13 encrypts the unique information using a cryptographic key, thereby generating encrypted information. The cryptographic key may be, for example, a common key, or may be a public key corresponding to the authentication apparatus 2 to which a barcode-like identifier-type authentication request is to be transmitted. If the cryptographic key is a common key, the common key may be a common key that is unique to the authentication-gaining apparatus 1, a common key that is unique to the authentication apparatus 2, or a common key that is unique to a pair of the authentication-gaining apparatus 1 and the authentication apparatus 2. In this case, a different common key is provided for each authentication-gaining apparatus 1. As will be described later, the common key is also held by the authentication apparatus 2. If the cryptographic key is a public key, the public key of the authentication apparatus 2 to which the transmission is to be performed may be, for example, contained in a later-described transmission instruction. The unique information may be encrypted using a cryptographic key that is common to the system, and this cryptographic key may be a common key, or a public key and a private key.

The display unit 14 repeatedly transmits a barcode-like identifier-type authentication request containing the encrypted information generated by the encrypting unit 13, to the authentication apparatus 2, during an authentication period. It is assumed that multiple authentication requests respectively containing encrypted information obtained by encrypting different pieces of unique information are transmitted during the authentication period. As described above, for example, if the unique information is each different pieces of information, encrypted information obtained by encrypting different unique information is contained in each authentication request that is transmitted from the legitimate authentication-gaining apparatus 1. On the other hand, for example, if there is any duplicate in the unique information, there may be a case in which encrypted information obtained by encrypting the same unique information is contained in at least two authentication requests that are transmitted from the legitimate authentication-gaining apparatus 1. Even in such a case, it is assumed that multiple authentication requests corresponding to different pieces of unique information are transmitted during the authentication period. If multiple authentication requests that are transmitted during the authentication period contains encrypted information obtained by encrypting the same unique information, for example, the number of authentication requests containing the encrypted information obtained by encrypting the same unique information may be predetermined. For example, it is also possible that encrypted information obtained by encrypting the same unique information is contained in a predetermined number of authentication requests, and unique information corresponding to encrypted information is different for each set of the predetermined number of authentication requests. The authentication request may contain information other than the encrypted information. For example, the authentication request may contain the ID of the authentication-gaining apparatus 1 from which the authentication request was transmitted.

The authentication period is typically a predetermined length of time. The authentication period may be started from when a first barcode-like identifier-type authentication request is transmitted. Accordingly, for example, it is also possible that the display unit 14 starts to count the time using a timer when a first authentication request is transmitted, and ends the authentication request transmission when a predetermined authentication period has elapsed. There is no particular limitation on the authentication period, but it may be a time that is as long as, for example, approximately from 200 milliseconds to 2 seconds. As will be described later, since authentication processing by the authentication apparatus 2 is not started until the authentication period is ended, the shorter the authentication period, the better. Accordingly, the authentication time is preferably 3 seconds or shorter, and more preferably 1 second or shorter. For example, when the authentication-gaining apparatus 1 receives a predetermined transmission instruction, the display unit 14 may start transmission of a request. The transmission instruction may be, for example, a beacon that is transmitted from a transmitter arranged near the authentication apparatus 2.

Typically, the display unit 14 repeatedly transmits a barcode-like identifier-type authentication request at predetermined time intervals. The time intervals may or may not be, for example, constant. In the case of the former, the time intervals may be or may not be set intervals. Even in the case in which the time intervals are not constant, an average time interval may be set. For example, if the communication is performed using a display that shows barcode-like identifiers at random times, the time intervals are not constant, but the average time interval is predetermined. In any case, the time intervals are intervals that are longer or equal to the shortest communication interval as defined by the communication standard for transmission of authentication requests by the display unit 14. For example, even when the authentication apparatus 2 performs intermittent reception, transmission is preferably performed such that at least any of the multiple authentication requests is received by the authentication apparatus 2. Accordingly, for example, the authentication request transmitting cycle may be different from the receiving cycle of the authentication apparatus 2, and it is also possible that authentication requests are transmitted at random transmitting intervals. The number of authentication requests that are transmitted by the display unit 14 during an authentication period may or may not be predetermined. Even in the case of the latter, the authentication period is predetermined, and the authentication requests are transmitted at predetermined time intervals, and thus, typically, the number of authentication requests that are transmitted during an authentication period or the range of the number is determined.

There is no limitation on the image communication standard according to which the display unit 14 transmits a barcode-like identifier-type authentication request. The authentication request may be communicated, for example, according to ISO/IEC18004 such as a QR code (registered trademark), ISO16023 such as MaxiCode, ISO/IEC 15420 such as a barcode, or other image communication standards. It is preferable that the authentication request is transmitted and received by, for example, a smartphone display and a barcode reader or camera.

In this embodiment, a case will be mainly described in which the communication is performed using a smartphone display and a camera. The transmitting intervals and the receiving cycle may be intervals that can be displayed on a commonly used display screen and an input cycle of the barcode reader or camera. The camera used in this case is preferably a CMOS camera or the like that can acquire barcode-like identifier-type authentication requests at a time.

The display unit 14 may or may not include an image transmission device (e.g., a display screen, etc.) for performing transmission. The display unit 14 may be realized by hardware, or may be realized by software such as a driver that drives a transmission device.

Next, the authentication apparatus 2 according to this embodiment will be described.

The receiving unit 21 repeatedly receives a barcode-like identifier-type authentication request containing encrypted information obtained through encryption using a cryptographic key and transmitted from the authentication-gaining apparatus 1, during the authentication period. Typically, authentication requests are transmitted from the authentication-gaining apparatus 1 described above. Meanwhile, as will be described later, there may be a case in which an attacker's apparatus receives an authentication request transmitted from the authentication-gaining apparatus 1 and again transmits the received authentication request, or acquires unique information by itself to generate encrypted information and transmits an authentication request containing the encrypted information. In that case, the receiving unit 21 cannot judge whether the authentication request was transmitted from a legitimate authentication-gaining apparatus 1 or from an attacker's apparatus, when an authentication request is received. Accordingly, it is assumed that the apparatus that transmitted an authentication request is referred to as an authentication-gaining apparatus 1. As will be described later, after multiple authentication requests are received, the authentication unit 24 judges whether the apparatus from which the transmission was performed is a real authentication-gaining apparatus 1 (i.e., a legitimate authentication-gaining apparatus 1) or an attacker's apparatus (i.e., an illegitimate authentication-gaining apparatus 1) using the authentication requests.

The receiving unit 21 may intermittently receive a barcode-like identifier-type authentication request. The intermittent reception may be a state in which periods during which information is received and periods during which information is not received are alternately repeated. For example, if an authentication request is received by a camera, such intermittent reception is performed. If intermittent reception is performed, for example, the lengths of the periods during which information is received and the periods during which information is not received may or may not be constant. In this embodiment, a case will be mainly described in which the receiving unit 21 performs intermittent reception.

The receiving unit 21 may or may not include an image receiving device (e.g., a camera, etc.) for receiving barcode-like identifiers. The receiving unit 21 may be realized by hardware, or may be realized by software such as a driver that drives a receiving device.

A decryption key is stored in the storage unit 22. For example, if the cryptographic key is a common key, the decryption key is the common key. In this case, the decryption key (the common key) may be stored in the storage unit 22 for each authentication-gaining apparatus 1. For example, multiple pieces of common key correspondence information each constituted by an ID of the authentication-gaining apparatus 1 and a common key of the authentication-gaining apparatus 1 identified with the ID may be stored in the storage unit 22. For example, if the cryptographic key is a public key, the decryption key is a private key that is paired with the public key. If the unique information contains a random number value or a count value, a random number table or a function for acquiring a random number value, the latest count value for generating a count value, and the like may be stored in the storage unit 22. Also, information indicating a threshold for the number of times that a barcode-like identifier is received, a receiving interval with a receiving probability that is lower than a threshold, and the like, which are used in the later-described processing, may be stored in the storage unit 22.

There is no limitation on the procedure in which information is stored in the storage unit 22. For example, information may be stored in the storage unit 22 via a storage medium, information transmitted via a communication line or the like may be stored in the storage unit 22, or information input via an input device may be stored in the storage unit 22. The storage unit 22 is preferably a non-volatile storage medium, but can also be realized by a volatile storage medium. Examples of the storage medium may include a semiconductor memory, a magnetic disk, and an optical disk.

The decrypting unit 23 decrypts the encrypted information using a decryption key, thereby acquiring decrypted information. For example, if the decryption key is a common key, and an authentication request contains the ID of the authentication-gaining apparatus 1 from which the authentication request was transmitted, the decrypting unit 23 may read a common key associated with the ID from the storage unit 22, and decrypt the encrypted information using the read common key. For example, if the decryption key is a private key, the decrypting unit 23 may read the private key from the storage unit 22, and decrypt the encrypted information using the read private key. The decrypted information obtained by decrypting the encrypted information contained in the authentication request transmitted from the legitimate authentication-gaining apparatus 1 is unique information. Accordingly, if the encrypted information cannot be decrypted or if the decrypted information that has been decrypted does not match the predetermined format of the unique information, for example, it can be judged that the apparatus that transmitted the authentication request containing the encrypted information is not a legitimate authentication-gaining apparatus 1.

The authentication unit 24 judges whether or not the authentication-gaining apparatus 1 is legitimate, using multiple barcode-like identifier-type authentication requests received during the authentication period and containing encrypted information that has been decrypted using a decryption key. If the decryption key is a common key, authentication of the authentication-gaining apparatus 1 is performed using multiple authentication requests containing encrypted information that has been decrypted using one common key, out of multiple authentication requests received during the authentication period. As described above, if the common key is different for each authentication-gaining apparatus 1, it can be considered that multiple authentication requests containing encrypted information that has been decrypted using one common key were transmitted from one authentication-gaining apparatus 1, and thus it is possible to perform authentication of that authentication-gaining apparatus 1 by performing authentication using the multiple authentication requests. On the other hand, if the decryption key is a private key, authentication of the authentication-gaining apparatus 1 is performed using multiple authentication requests containing encrypted information that has been decrypted using a private key of the authentication apparatus 2, out of multiple authentication requests received during the authentication period. If the decryption key is a private key, there may be a case in which multiple authentication requests containing encrypted information that has been decrypted using a private key include authentication requests transmitted from multiple authentication-gaining apparatuses 1. Accordingly, for example, if an authentication request contains the ID of the authentication-gaining apparatus 1 from which the authentication request was transmitted, the authentication unit 24 may judge whether or not the authentication-gaining apparatus 1 is legitimate, using multiple authentication requests containing the same ID and received during the authentication period. The operation that judges whether or not the authentication-gaining apparatus 1 is legitimate, using multiple authentication requests may be an operation that performs judgement using multiple authentication requests themselves, or using information related to the multiple authentication requests. The information related to the multiple authentication requests is, for example, multiple pieces of decrypted information respectively acquired from the multiple authentication requests, receiving intervals of the multiple authentication requests, the number of the multiple authentication requests, or other information related to the multiple authentication requests. If an authentication request contains the ID of the authentication-gaining apparatus 1 from which the authentication request was transmitted, typically, authentication requests containing encrypted information that can be decrypted using one common key contain the same ID. Accordingly, if the cryptographic key is a common key, the authentication unit 24 may judge whether or not the authentication-gaining apparatus 1 is legitimate, using multiple authentication requests containing the same ID and received during the authentication period. The authentication unit 24 may perform authentication of an authentication-gaining apparatus 1, using multiple authentication requests received from the authentication-gaining apparatus 1 during a predetermined authentication period from when a first authentication request is received from the authentication-gaining apparatus 1.

For example, if all of multiple barcode-like identifier-type authentication requests received during an authentication period are transmitted from illegitimate authentication-gaining apparatuses 1, the authentication unit 24 judges that the authentication-gaining apparatuses 1 are not legitimate. Also, for example, if multiple authentication requests received during an authentication period include an authentication request transmitted from an illegitimate apparatus, the authentication unit 24 judges that the authentication-gaining apparatuses 1 that transmitted the multiple authentication requests are not legitimate. That is to say, if multiple authentication requests are transmitted from a legitimate authentication-gaining apparatus 1 and an illegitimate authentication-gaining apparatus 1, it is judged that the authentication-gaining apparatuses 1 from which the multiple authentication requests were transmitted are not legitimate. In this case, the apparatuses from which transmission of the authentication requests was performed include at least an attacker's apparatus, and even in the case in which the apparatus from which the transmission was performed include a legitimate authentication-gaining apparatus 1, it is not possible to distinguish them from each other. Thus, it is judged that both apparatuses are not legitimate.

Judgment Based on Duplicates in Decrypted Information

For example, if there are a predetermined number or more of duplicates in multiple pieces of decrypted information, the authentication unit 24 may judge that the authentication-gaining apparatus 1 is not legitimate. As described above, if a legitimate authentication-gaining apparatus 1 transmits multiple barcode-like identifier-type authentication requests respectively containing encrypted information obtained by encrypting different pieces of unique information, during an authentication period, typically, the duplicate level in multiple pieces of decrypted information (i.e., unique information) respectively acquired from the multiple authentication requests received during the authentication period has been determined. For example, if authentication requests contain encrypted information obtained by encrypting unique information that is different for each authentication request, it is natural that multiple pieces of decrypted information respectively acquired from multiple authentication requests received from a legitimate authentication-gaining apparatus 1 during the authentication period are different pieces of information, and thus there is no duplicate in the multiple pieces of decrypted information. Accordingly, if otherwise, i.e., in a case in which there are duplicates in the multiple pieces of decrypted information, the authentication unit 24 can judge that the authentication-gaining apparatus 1 that transmitted an authentication request containing the encrypted information from which the decrypted information was acquired is not legitimate. For example, if the $1^{-st}$ to $N^{-th}$ pieces of authentication request received from a legitimate authentication-gaining apparatus 1 contain encrypted information obtained by encrypting the same first unique information and the $N+1^{-th}$ to $2N^{-th}$ pieces of authentication request received therefrom contain encrypted information obtained by encrypting the same second unique information, that is, if each set of N authentication requests contains encrypted information obtained by encrypting different pieces of unique information, there are up to N duplicates in multiple pieces of decrypted information respectively acquired from the multiple authentication requests received during the authentication period. Accordingly, in this case, if there are N+1 or more duplicates in the multiple pieces of decrypted information, that is, there are N+1 or more pieces of same decrypted information, the authentication unit 24 may judge that the authentication-gaining apparatus 1 is not legitimate. Note that N is an integer of 1 or more. In this example, when the receiving unit 21 of the authentication apparatus 2 is performing intermittent reception, there may be a case in which, even in the case in which N is an integer of 2 or more, there are only M pieces of same decrypted information in multiple pieces of decrypted information acquired from multiple authentication requests received by the authentication apparatus 2 from a legitimate authentication-gaining apparatus 1. Note that M is a positive integer that is smaller than N. Accordingly, in such a case, it is also possible that, if there are M+1 or more duplicates in multiple pieces of decrypted information, that is, if there are M+1 or more pieces of same decrypted information, the authentication unit 24 judges that the authentication-gaining apparatus 1 is not legitimate. If there are a predetermined number of duplicates in multiple pieces of decrypted information, for example, it can be considered that an authentication request transmitted from a legitimate authentication-gaining apparatus 1 is copied and transmitted by an illegitimate authentication-gaining apparatus 1. The predetermined number may be stored, for example, in the storage unit 22.

Typically, when different pieces of unique information are encrypted, different pieces of encrypted information are obtained. Accordingly, the authentication unit 24 may judge whether or not there are a predetermined number or more of duplicates in multiple pieces of decrypted information, based on whether or not there are the predetermined number or more of duplicates in the multiple pieces of encrypted information. For example, if information other than the encrypted information contained in authentication requests is the same in the authentication requests, the authentication unit 24 may judge whether or not there are a predetermined number or more of duplicates in multiple pieces of decrypted information, based on whether or not there are a predetermined number or more of duplicates in the multiple authentication requests.

Judgment Based on Number of Times that Authentication Request is Received

For example, if a barcode-like identifier-type authentication request is received more than a predetermined number of times during a predetermined period, the authentication unit 24 may judge that the authentication-gaining apparatus 1 is not legitimate. The predetermined period may be, for example, the authentication period, or may be a period (e.g., a unit period, etc.) that is shorter than the authentication period. The predetermined number of times may be stored, for example, in the storage unit 22. As described above, if the authentication-gaining apparatus 1 repeatedly transmits an authentication request at predetermined time intervals, the maximum number of authentication requests that are received during a predetermined period has been determined. Accordingly, if the number of authentication requests received during a predetermined period is more than the maximum number, at least, an authentication request is transmitted also from an illegitimate authentication-gaining apparatus 1, and thus the authentication unit 24 can judge that the authentication-gaining apparatus 1 that transmitted the authentication request is not legitimate.

Judgment Based on Authentication Request Receiving Intervals

For example, if barcode-like identifier-type authentication request receiving intervals in an authentication period include a receiving interval with a probability that is lower than a threshold, the authentication unit 24 may judge that the authentication-gaining apparatus 1 is not legitimate. The authentication request receiving interval is the length of the time from when an authentication request is received to when a next authentication request is received. The authentication request receiving interval is an interval at which authentication requests transmitted from the authentication-gaining apparatus 1 with the same ID are received. If the authentication-gaining apparatus 1 repeatedly transmits an authentication request according to a communication standard, it is often the case that the authentication request receiving intervals are statistically specific intervals regardless of whether or not the receiving unit 21 is performing intermittent reception, and thus some receiving intervals have a very low probability. Accordingly, if an authentication request is received at a receiving interval with such a very low probability, it can be considered that an authentication request is transmitted also from an illegitimate authentication-gaining apparatus 1, and thus the authentication unit 24 can judge that the authentication-gaining apparatus 1 that transmitted the authentication request is not legitimate. The probability of a receiving interval can be acquired, for example, by actually repeating transmission and reception of information from one apparatus according to a communication standard for transmitting authentication requests. With this configuration, for example, it is possible to acquire a histogram in which the horizontal axis indicates the receiving interval and the vertical axis indicates the probability. With the histogram, for example, it is possible to see that the probability at which information is received at receiving intervals of T1 to T2 milliseconds is P1, and the probability at which information is received at receiving intervals of T2 to T3 milliseconds is P2, for example. Thus, if an authentication request is received at a receiving interval with probability that is lower than a predetermined probability (e.g., 1%, 0.1%, etc.), the authentication unit 24 can judge that the authentication-gaining apparatus 1 that transmitted the authentication request is not legitimate.

Judgment Based on Matching Between Decrypted Information and Unique Information

For example, if multiple pieces of decrypted information respectively acquired from multiple barcode-like identifier-type authentication requests received during an authentication period do not match unique information, the authentication unit 24 may judge that the authentication-gaining apparatus 1 is not legitimate. The decrypted information acquired from authentication requests is decrypted information obtained by decrypting encrypted information contained in the authentication requests. The authentication unit 24 may judge whether or not the multiple pieces of decrypted information match the unique information, using a unique information generating rule in the authentication-gaining apparatus 1. If the multiple pieces of decrypted information respectively acquired from the multiple authentication requests do not match the unique information, it can be considered that at least some of the authentication requests are transmitted from an illegitimate authentication-gaining apparatus 1. The state in which decrypted information does not match unique information may be, for example, a state in which a value of decrypted information does not match a value of unique information, or a state in which multiple pieces of decrypted information do not match a rule of unique information.

For example, in a case in which the unique information is random number values, the authentication unit 24 may perform judgment using a random number table or a function for acquiring the random number values. In a case in which the unique information is count values, the authentication unit 24 may perform judgment using a rule for generating the count values (e.g., increment by 2, etc.). In a case in which the unique information is time, judgment may be performed using a format of the time (e.g., time in o'clock, minutes, and seconds, minutes and seconds, etc.). In a case in which the unique information is one-time passwords, the authentication unit 24 may perform judgment using a rule for generating the one-time passwords or a generator of the one-time passwords.

It is also possible that, for example, the authentication unit 24 judges, for each piece of decrypted information, whether or not the multiple pieces of decrypted information match the unique information, and judges that the multiple pieces of decrypted information do not match the unique information in a case in which there is even one piece of decrypted information that does not match the unique information. For example, in a case in which the unique information is random number values, count values, or one-time passwords, it is also possible that, if decrypted information matches unique information generated by the authentication unit 24, the authentication unit 24 judges that the decrypted information matches the unique information, and, if they do not match each other, the authentication unit 24 judges that the decrypted information does not match the unique information. For example, in a case in which the unique information is transmitted from the authentication apparatus 2

(e.g., in a case in which the unique information is a challenge), it is also possible that, if the decrypted information matches the transmitted unique information, the authentication unit 24 judges that the decrypted information matches the unique information, and, if they do not match each other, the authentication unit 24 judges that the decrypted information does not match the unique information. In this manner, for example, challenge and response authentication can be performed. In this case, the authentication unit 24 may judge whether or not the encrypted information matches information obtained by encrypting the unique information transmitted from the authentication apparatus 2 using a cryptographic key, instead of judging whether or not the decrypted information matches the unique information. For example, in a case in which the unique information is time, it is also possible that, if a difference between the time that is the decrypted information and the receiving time of the authentication request corresponding to the decrypted information is smaller than a predetermined threshold, the authentication unit 24 judges that the decrypted information matches the unique information, and, if the difference therebetween is larger than the predetermined threshold, the authentication unit 24 judges that the decrypted information does not match the unique information. If the difference therebetween is equal to the predetermined threshold, the authentication unit 24 may or may not judge that the decrypted information matches the unique information. If the time format of the decrypted information is different from the time format of the unique information, the authentication unit 24 may judge that the decrypted information does not match the unique information.

Furthermore, it is also possible that, for example, the authentication unit 24 judges, for each group of multiple pieces of decrypted information, whether or not the multiple pieces of decrypted information match the unique information. For example, in a case in which the unique information is count values, it is also possible that, if multiple pieces of decrypted information in the received order match a count value rule, the authentication unit 24 judges that the multiple pieces of decrypted information match the unique information, and, if otherwise, the authentication unit 24 judges that the multiple pieces of decrypted information do not match the unique information. Specifically, if the multiple pieces of decrypted information are "2", "4", "6", "8" . . . in the received order, and the unique information generating rule is to increment the value by 2, the multiple pieces of decrypted information matches the unique information generating rule, and thus the authentication unit 24 judges that the multiple pieces of decrypted information match the unique information. On the other hand, for example, if the multiple pieces of decrypted information are "2", "4", "6", "6", "8" . . . in the received order, and the unique information generating rule is to increment the value by 2, the multiple pieces of decrypted information do not match the unique information generating rule, and thus the authentication unit 24 judges that the multiple pieces of decrypted information do not match the unique information. For example, in a case in which the unique information is time, the authentication unit 24 may acquire, for each set of multiple pieces of decrypted information, a time difference that is a difference between the time that is the decrypted information and the receiving time of the authentication request corresponding to the decrypted information, judges that the multiple pieces of decrypted information match the unique information if the acquired multiple time differences are constant, and judges that the multiple pieces of decrypted information do not match the unique information if the acquired multiple time differences are not constant. With this configuration, even in the case in which the clock unit of the authentication-gaining apparatus 1 and the clock unit of the authentication apparatus 2 are not completely synchronized with each other, it is possible to properly judge whether or not the decrypted information matches the unique information that is the time. The reason for this seems to be that the authentication-gaining apparatus 1 and the authentication apparatus 2 typically perform short-distance image communication, and delays resulting from the image communication are substantially constant between the multiple authentication requests. The state in which multiple time differences are constant may be, for example, a state in which a difference between the largest value and the smallest value of the multiple time differences is smaller than a predetermined threshold, or a state in which the variation of the multiple time differences (e.g., a variance, a standard deviation, etc.) is smaller than a predetermined threshold. For example, in a case in which the unique information is time, if the time that is the decrypted information does not increase according to the receiving order, for example, if the time that is the decrypted information corresponding to an authentication request received at a point A in time indicates a time after the time that is the decrypted information corresponding to an authentication request received at a point B in time, which is the time after the point A in time, the authentication unit 24 may judge that the multiple pieces of decrypted information do not match the unique information. The reason for this seems to be that, in that case, the authentication request received at the point B in time is an authentication request that was obtained by an attacker's apparatus copying an authentication request transmitted earlier than the authentication request received at the point A in time, and was transmitted.

Furthermore, it is also possible that, for example, the authentication unit 24 judges, for each piece of decrypted information and for each group of multiple pieces of decrypted information, whether or not the multiple pieces of decrypted information match the unique information. In this case, if it is judged that they do not match each other at least in either one of the judgments, the authentication unit 24 judges that the multiple pieces of decrypted information do not match the unique information, and, if it is judged that they match each other in both judgments, the authentication unit 24 judges that the multiple pieces of decrypted information match the unique information.

Furthermore, if the unique information contains a unique portion (e.g., a random number value, etc.) and a non-unique portion (e.g., an apparatus ID, etc.), the decrypted information also contains information corresponding to the unique portion and information corresponding to the non-unique portion. In this case, the authentication unit 24 may judge whether or not the multiple pieces of decrypted information match the unique information, based on whether or not the unique portion contained in the unique information matches the information corresponding to the unique portion contained in the decrypted information, or based on whether or not the unique information itself matches the decrypted information itself.

The authentication unit 24 may perform judgment other than those described above. Also in the case in which encrypted information contained in an authentication request cannot be decrypted using a decryption key, the authentication unit 24 may judge that the authentication-gaining apparatus 1 that transmitted the authentication request is not legitimate. The reason for this seems to be that, if the decryption key is a common key, the authentication-gaining apparatus 1 that transmitted the authentication request does not hold the common key held by the authentication apparatus 2, and thus it is not a legitimate authentication-gaining apparatus 1.

Furthermore, in the case of performing multiple judgments, if it is not judged that the authentication-gaining apparatus 1 is not legitimate in all judgments, the authentication unit 24 judges that the authentication-gaining apparatus 1 is legitimate, and, if it is judged that the authentication-gaining apparatus 1 is not legitimate in at least any one of the judgments, the authentication unit 24 judges that the authentication-gaining apparatus 1 is not legitimate. The judging that an authentication-gaining apparatus 1 is legitimate is authenticating the authentication-gaining apparatus 1. The judging that an authentication-gaining apparatus 1 is not legitimate is not authenticating the authentication-gaining apparatus 1.

The output unit 25 outputs a judgment result by the authentication unit 24. The judgment result is a judgment result as to whether the authentication-gaining apparatus 1 is legitimate or not legitimate, that is, information indicating whether the authentication-gaining apparatus 1 is authenticated or not authenticated. It is preferable that the output unit 25 outputs a judgment result by the authentication unit 24, to a constituent element, an apparatus, or the like for performing processing according to the authentication result. The output unit 25 may transmit a judgment result by the authentication unit 24, to the authentication-gaining apparatus 1 from which the authentication request was transmitted.

The output may be, for example, display on a display device (e.g., a liquid crystal display, an organic EL display, etc.), transmission via a communication line to a predetermined device, printing by a printer, sound output by a speaker, accumulation in a storage medium, or delivery to another constituent element. The output unit 25 may or may not include a device that performs output (e.g., a display device, a communication device, a printer, etc.). The output unit 25 may be realized by hardware, or may be realized by software such as a driver that drives these devices.

If unique information or a unique portion is transmitted from the authentication apparatus 2 to the authentication-gaining apparatus 1 (e.g., if challenge and response authentication is performed), the authentication apparatus 2 may include a transmitting unit that transmits unique information or a unique portion. For example, the transmitting unit may transmit unique information or a unique portion for each transmission of a barcode-like identifier-type authentication request from the authentication-gaining apparatus 1, or may collectively transmit multiple pieces of unique information or multiple unique portions. In the case of the former, transmission of unique information or a unique portion and reception of a barcode-like identifier-type authentication request are repeated. In the case of the latter, multiple pieces of unique information or multiple unique portions may be contained in an instruction to transmit a barcode-like identifier-type authentication request.

Figure 2:
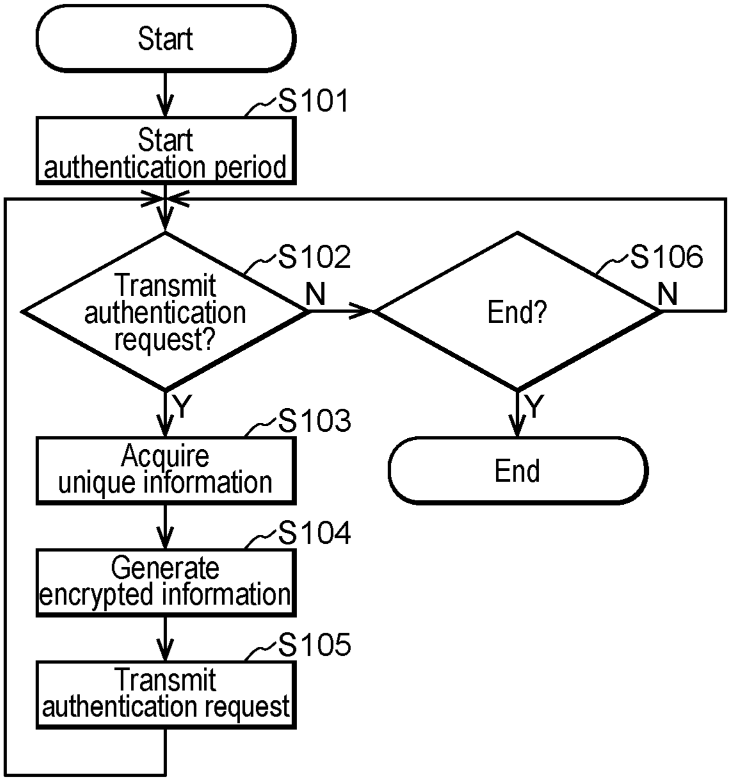
FIG. 2 is a flowchart showing an operation of the authentication-gaining apparatus according to the embodiment.

Next, an operation of the authentication-gaining apparatus 1 will be described with reference to the flowchart in FIG. 2. FIG. 2 is a flowchart showing an authentication request transmitting method that is processing after the authentication-gaining apparatus 1 judges to start transmission of a barcode-like identifier-type authentication request. As described above, for example, upon receipt of a predetermined transmission instruction, the authentication-gaining apparatus 1 may judge to start transmission of an authentication request.

(Step S101) The display unit 14 starts an authentication period. For example, the display unit 14 may start to count the time using a timer in order to detect an end of the authentication period.

(Step S102) The display unit 14 judges whether or not to transmit a barcode-like identifier-type authentication request. If an authentication request is to be transmitted, the procedure advances to step S103, and, if otherwise, the procedure advances to step S106. For example, in the case of transmitting an authentication request at predetermined time intervals, the display unit 14 may judge to transmit an authentication request at the predetermined time intervals.

(Step S103) The acquiring unit 11 acquires unique information. The unique information may be acquired, for example, by acquiring a unique portion and combining the acquired unique portion and a non-unique portion.

(Step S104) The encrypting unit 13 encrypts the unique information acquired in step S103, using a cryptographic key, thereby generating encrypted information.

(Step S105) The display unit 14 transmits a barcode-like identifier-type authentication request containing the encrypted information generated in step S104. The authentication request may also contain information other than the encrypted information. Then, the procedure returns to step S102.

(Step S106) The display unit 14 judges whether or not to end the transmission of a barcode-like identifier-type authentication request. If the transmission is to be ended, the series of processing that transmits authentication requests is ended, and, if otherwise, the procedure returns to step S102. For example, if the authentication period started in step S101 is ended, the display unit 14 may judge to end the transmission of an authentication request. Specifically, if the value of the timer with which the counting of the time is started in step S101 exceeds the length of time of the authentication period, the display unit 14 may judge to end the transmission of an authentication request, and, if otherwise, the display unit 14 may judge not to end the transmission.

Although the flowchart in FIG. 2 shows a case in which acquisition of unique information, generation of encrypted information, and transmission of an authentication request are repeated, but there is no limitation to this. For example, it is also possible that multiple pieces of unique information are acquired, multiple pieces of encrypted information are generated by encrypting the multiple pieces of unique information, and then transmission of an authentication request containing each piece of the encrypted information is repeated. If encrypted information obtained by encrypting the same unique information is contained in multiple authentication requests, it is also possible to repeatedly use the same unique information and the same encrypted information, instead of acquiring unique information and generating encrypted information the same number of times as the number of duplicates in the unique information. The authentication period may be managed in steps S101 and S106 by a constituent element other than the display unit 14, for example, the acquiring unit 11 or the like. The processing order in the flowchart in FIG. 2 is merely an example, and the order of the steps may be changed, as long as similar results can be obtained.

Figure 3:
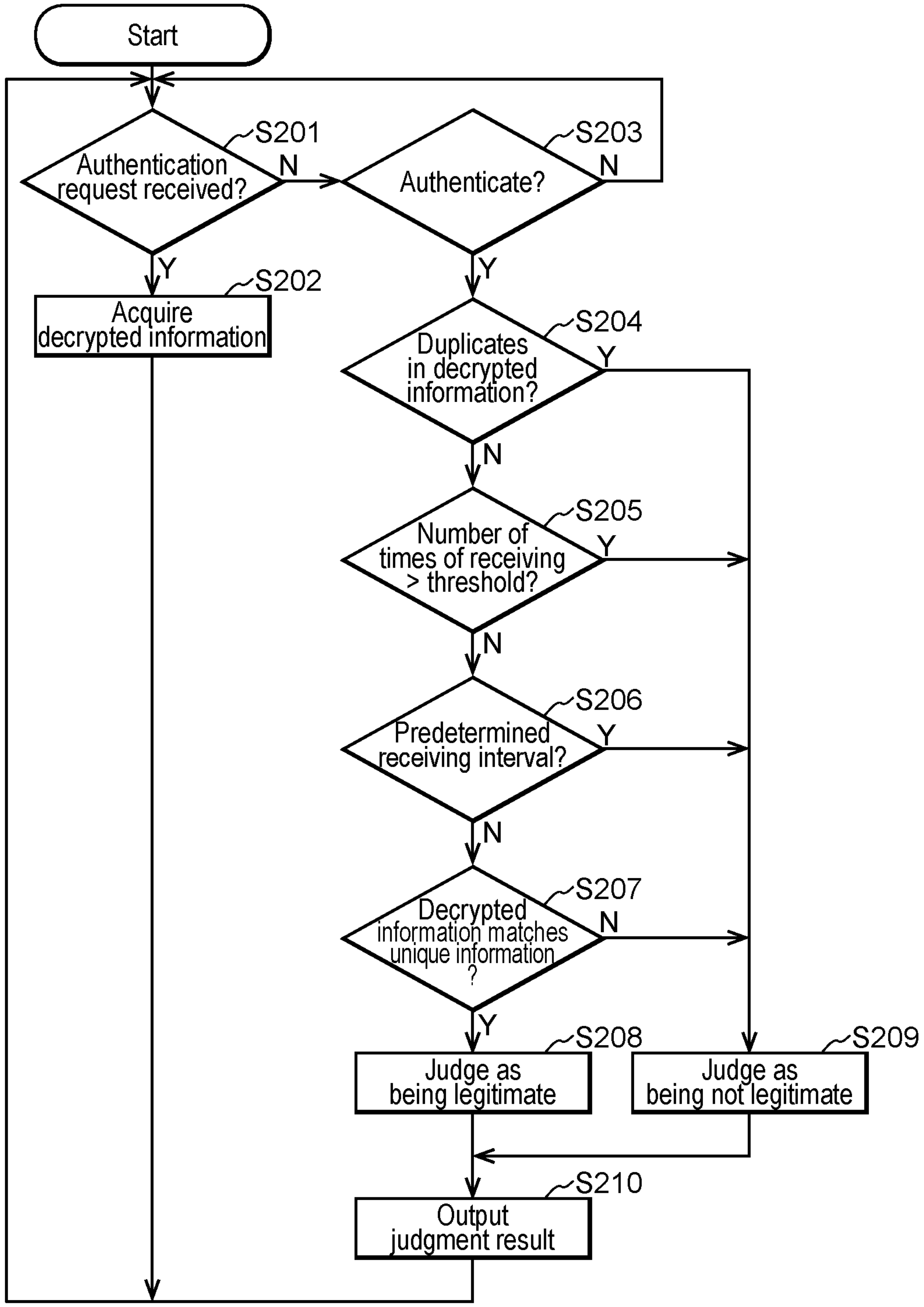
FIG. 3 is a flowchart showing an operation of the authentication apparatus according to the embodiment.

Next, an operation of the authentication apparatus 2 will be described with reference to the flowchart in FIG. 3. FIG. 3 is a flowchart showing an authentication method that is processing regarding authentication of the authentication-gaining apparatus 1 by the authentication apparatus 2 using multiple authentication requests.

(Step S201) The receiving unit 21 judges whether or not it has received a barcode-like identifier-type authentication request. If it has received an authentication request, the procedure advances to step S202, and, if otherwise, the procedure advances to step S203. If the receiving unit 21 intermittently receives an authentication request, it is also possible that the receiving unit 21 receives an authentication request only during a receiving period, and does not receive an authentication request during a period that is not the receiving period.

(Step S202) The decrypting unit 23 decrypts encrypted information contained in the barcode-like identifier-type authentication request received in step S201, using a decryption key, thereby acquiring decrypted information. Then, the procedure returns to step S201. The decrypting unit 23 may accumulate the decrypted information in the storage unit 22 in association with the ID of the authentication-gaining apparatus 1 from which the authentication request was transmitted. The decrypting unit 23 may accumulate the decrypted information in the storage unit 22 in association with the receiving time of the authentication request corresponding to the decrypted information. If encrypted information contained in the authentication request received in step S201 cannot be decrypted using a decryption key, the decrypting unit 23 does not perform decryption, and the procedure may return to step S201. In this case, the authentication unit 24 may judge that the authentication-gaining apparatus 1 from which the authentication request containing the encrypted information that cannot be decrypted was transmitted is not legitimate.

(Step S203) The authentication unit 24 judges whether or not to perform authentication processing. If authentication processing is to be performed, the procedure advances to step S204, and, if otherwise, the procedure returns to step S201. For example, when an authentication period has elapsed after a first barcode-like identifier-type authentication request containing encrypted information that has been decrypted using a common key is received, the authentication unit 24 may judge to perform authentication processing using multiple authentication requests containing the encrypted information that has been decrypted using the common key. For example, when an authentication period has elapsed after a first authentication request is received from an authentication-gaining apparatus 1 with an ID, the authentication unit 24 may judge to perform authentication processing using multiple authentication requests transmitted from the authentication-gaining apparatus 1 with that ID.

(Step S204) The authentication unit 24 judges whether or not there are a predetermined number or more of duplicates in multiple pieces of decrypted information respectively acquired from multiple barcode-like identifier-type authentication requests. If there are a predetermined number or more of duplicates in multiple pieces of decrypted information, the procedure advances to step S209, and, if otherwise, the procedure advances to step S205.

(Step S205) The authentication unit 24 judges whether or not the number of times that a barcode-like identifier-type authentication request is received during a predetermined period is more than a predetermined threshold. If the number of times that an authentication request is received is more than the predetermined threshold, the procedure advances to step S209, and, if otherwise, the procedure advances to step S206.

(Step S206) The authentication unit 24 judges whether or not barcode-like identifier-type authentication request receiving intervals in the authentication period include a receiving interval with a probability that is lower than a threshold. If authentication request receiving intervals include a receiving interval with a probability that is lower than a threshold, the procedure advances to step S209, and, if otherwise, the procedure advances to step S207.

(Step S207) The authentication unit 24 judges whether or not multiple pieces of decrypted information respectively corresponding to multiple barcode-like identifier-type authentication requests received during the authentication period match the unique information. If the multiple pieces of decrypted information match the unique information, the procedure advances to step S208, and, if otherwise, the procedure advances to step S209.

It is assumed that the processing from steps S204 to S207 is performed, for example, for multiple authentication requests received during the authentication period and containing encrypted information that has been decrypted using a decryption key. That is to say, the processing from steps S204 to S207 may be performed, for example, for multiple authentication requests received from an authentication-gaining apparatus 1 with an ID during an authentication period.

(Step S208) The authentication unit 24 judges that the authentication-gaining apparatus 1 that transmitted the multiple barcode-like identifier-type authentication requests is legitimate. That is to say, the authentication-gaining apparatus 1 is authenticated.

(Step S209) The authentication unit 24 judges that the authentication-gaining apparatus 1 that transmitted the multiple barcode-like identifier-type authentication requests is not legitimate. That is to say, the authentication-gaining apparatus 1 is not authenticated.

(Step S210) The output unit 25 outputs the judgment result in step S208 or S209. Then, the procedure returns to step S201.

Although the flowchart in FIG. 3 shows a case in which the processing in steps S204 to S207 is performed in the authentication processing, but there is no limitation to this. In the processing, processing in one or more of the steps may not be performed. Note that, even in that case, it is preferable that authentication processing using multiple barcode-like identifier-type authentication requests, for example, at least any processing in steps S204 to S206 is performed. The processing order in the flowchart in FIG. 3 is merely an example, and the order of the steps may be changed, as long as similar results can be obtained. For example, the processing in steps S204 to S207 may be performed in different orders. In the flowchart in FIG. 3, the processing ends at power off or at an interruption of ending processing.

Next, operations of the authentication-gaining apparatus 1 and the authentication apparatus 2 according to this embodiment will be described by way of a specific example. In this specific example, it is assumed that the receiving unit 21 of the authentication apparatus 2 intermittently receives a barcode-like identifier-type authentication request. That is to say, it is assumed that the receiving unit 21 receives an authentication request only during a receiving period, and does not receive an authentication request transmitted from the authentication-gaining apparatus 1 in the other periods.

Furthermore, in this specific example, it is assumed that a legitimate authentication-gaining apparatus 1 transmits ten authentication requests during an authentication period. As described above, the receiving unit 21 performs intermittent reception of a barcode-like identifier, and thus, if the number of authentication requests received from an authentication-gaining apparatus 1 during an authentication period is more than the threshold "7", the authentication unit 24 judges that the authentication-gaining apparatus 1 is not legitimate.

Furthermore, in this specific example, it is assumed that the unique information is time. Furthermore, it is assumed that, if the difference between the time that is the decrypted information and the time when the barcode-like identifier-type authentication request corresponding to the decrypted information was received is larger than a predetermined threshold, the authentication unit 24 judges that the authentication-gaining apparatus 1 that transmitted the authentication request is not legitimate. It is assumed that the unique information is encrypted using a common key.

Furthermore, in this specific example, a case will be mainly described in which authentication requests that are transmitted contain encrypted information obtained by encrypting unique information that is different for each authentication request, and a case in which multiple authentication requests that are transmitted during an authentication period contain encrypted information obtained by encrypting the same unique information will be described later.

Transmission of Authentication Request Only from Legitimate Authentication-Gaining Apparatus 1

Figure 4:
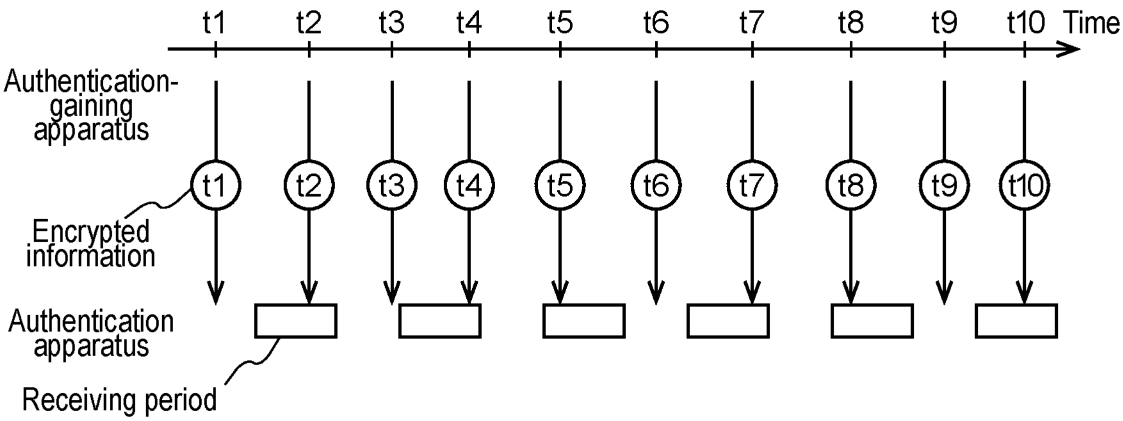
FIG. 4 is a chart illustrating transmitting and receiving of an authentication request according to the embodiment.

First, a case in which a barcode-like identifier-type authentication request is transmitted only from a legitimate authentication-gaining apparatus 1 will be described with reference to FIG. 4. As shown in FIG. 4, it is assumed that authentication requests containing information obtained by encrypting times t1 to t10 that are each unique information are transmitted from the authentication-gaining apparatus 1 to the authentication apparatus 2 at times t1 to t10.

Specifically, upon receipt of a transmission instruction containing the ID of the authentication apparatus 2, transmitted from the authentication apparatus 2, the display unit 14 of the authentication-gaining apparatus 1 starts to count the time using a timer (step S101). It is assumed that the time at the point in time was t1. For example, if the ID of the authentication apparatus 2 stored in the storage unit 12 and the ID contained in the transmission instruction match each other, the authentication-gaining apparatus 1 may judge that the transmission instruction was transmitted from the authentication apparatus 2. Since it is transmission of a first barcode-like identifier-type authentication request, the display unit 14 judges to immediately transmit an authentication request without standby, and instructs the acquiring unit 11 to acquire unique information, via an unshown route (step S102). Upon receipt of the instruction, the acquiring unit 11 acquires unique information that is the time t1 at the point in time and delivers it to the encrypting unit 13 (step S103). Upon receipt of the time t1 that is the unique information, the encrypting unit 13 acquires the ID of the authentication-gaining apparatus 1, stored in the storage unit 12, acquires the ID of the authentication apparatus 2 from the transmission instruction or the storage unit 12, generates encrypted information by encrypting the time t1, the ID of the authentication-gaining apparatus 1, and the ID of the authentication apparatus 2, using a common key stored in the storage unit 12, and delivers it to the display unit 14 (step S104). Upon receipt of the encrypted information, the display unit 14 transmits an authentication request containing the encrypted information and the ID of the authentication-gaining apparatus 1 acquired from the storage unit 12, using a display screen (step S105). Such transmission of an authentication request is repeated, and ten authentication requests are transmitted from the authentication-gaining apparatus 1 to the authentication apparatus 2 by the time t10 (step S102 to S105) Immediately after a $10^{-th}$ authentication request is transmitted at the time t10, if the value of the timer started at the time t1 exceeds the length of time of the authentication period, the processing that transmits authentication requests is ended (step S106).

When the receiving unit 21 of the authentication apparatus 2 is performing intermittent reception of a barcode-like identifier, as shown in FIG. 4, only barcode-like identifier-type authentication requests transmitted at the times t2, t4, t5, t7, t8, and t10 are received by the authentication apparatus 2. If an authentication request is received (step S201), the decrypting unit 23 acquires the ID of the authentication-gaining apparatus 1 contained in the authentication request, and acquires a common key associated with the ID from the storage unit 22. The decrypting unit 23 decrypts the encrypted information contained in the received authentication request, using the thus acquired common key, thereby acquiring decrypted information (step S202). Then, the decrypting unit 23 judges whether or not the ID of the authentication-gaining apparatus 1 contained in the decrypted information matches the ID of the authentication-gaining apparatus 1 contained in cleartext in the authentication request, and whether or not the ID of the authentication apparatus 2 contained in the decrypted information matches the ID of the authentication apparatus 2 including that decrypting unit 23. In this case, it is assumed that the IDs match each other in both cases. Then, the decrypting unit 23 accumulates the decrypted information in the storage unit 22 in association with the ID of the authentication-gaining apparatus 1 contained in the authentication request and the receiving time of the authentication request. It is also possible that the decrypting unit 23 does not accumulate the decrypted information in the storage unit 22 if the IDs do not match each other in either case. Such processing is repeated for each reception of an authentication request.

The authentication unit 24 judges, for each ID of the authentication-gaining apparatus 1, whether or not the period from the earliest receiving time of a barcode-like identifier to the current time exceeds the length of time of the authentication period, in the decrypted information stored in the storage unit 22. If there is an ID with a period from the earliest receiving time to the current time exceeding the length of time of the authentication period, the authentication unit 24 judges to perform authentication processing on the authentication-gaining apparatus 1 with that ID, and performs authentication processing using the multiple pieces of decrypted information and the receiving times stored in association with the ID (step S203).

Specifically, the authentication unit 24 judges whether or not there is any duplicate in the decrypted information (step S204). In this case, each piece of decrypted information contains a different time, and thus there is no duplicate in the decrypted information. Accordingly, the authentication unit 24 judges whether or not the number of times that reception is performed is more than a threshold (step S205). In this specific example, as described above, it is assumed that the threshold is set to "7". Then, as shown in FIG. 4, it is judged that the number of times "6" that reception is performed is not more than the threshold "7".

Next, the authentication unit 24 acquires each receiving interval that is the length of the time from when a barcode-like identifier-type authentication request is received to when a next authentication request is received, using the receiving times of barcode-like identifiers stored in the storage unit 22. Then, it is judged whether or not the receiving intervals include a receiving interval with a probability that is lower than a threshold, the receiving interval being stored in the storage unit 22 (step S206). In this case, it is assumed that no receiving interval with a probability that is lower than a threshold is included. Accordingly, the authentication unit 24 judges whether or not the decrypted information matches the unique information (step S207). In this example, it is judged whether or not the time that is a unique portion, out of the decrypted information, matches the receiving time. Specifically, as described above, if the difference between the time contained in the decrypted information and the receiving time of the authentication request corresponding to the decrypted information is smaller than a predetermined threshold, the authentication unit 24 judges that the decrypted information matches the unique information. Then, the authentication unit 24 perform such judgment on each piece of decrypted information. In this specific example, it is assumed that it is judged that all pieces of decrypted information match the unique information. Then, the authentication unit 24 judges that the authentication-gaining apparatus 1 that transmitted the multiple authentication requests is legitimate (step S208). Then, the output unit 25 outputs the judgment result (step S209). After the series of judgment is ended, the decrypted information corresponding to the ID of the authentication-gaining apparatus 1 that is to be subjected to the judgment, stored in the storage unit 22, and the like may be deleted, or a flag or the like indicating that the processing on the decrypted information and the like has been completed may be set. In the case of the latter, it is assumed that the decrypted information and the like for which a flag or the like is set indicating that the processing has been completed is not used in subsequent authentication processing.

Transmission of Authentication Request Using Different Common Key

Figure 5:
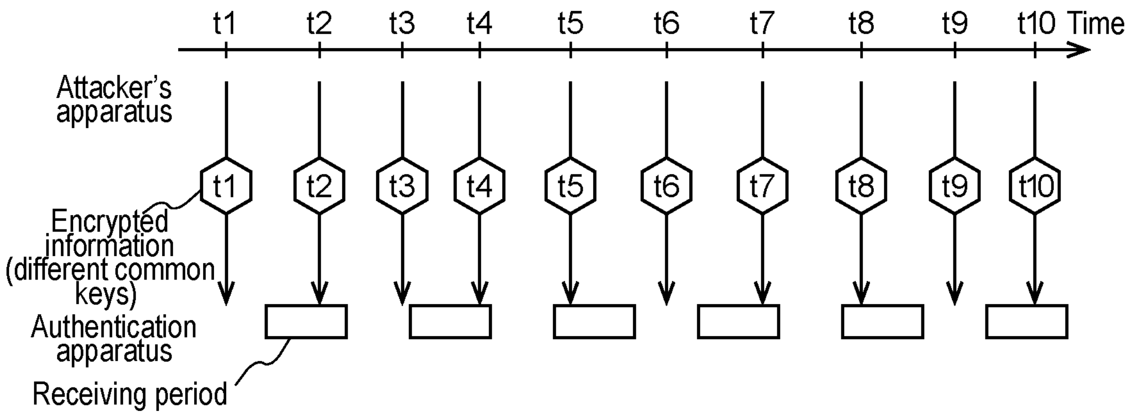
FIG. 5 is a chart illustrating transmitting and receiving of an authentication request according to the embodiment.

Hereinafter, a case will be described in which a barcode-like identifier-type authentication request containing encrypted information encrypted using a common key different from that of a legitimate authentication-gaining apparatus 1 is transmitted from an attacker's apparatus. In this case, for example, as shown in FIG. 5, each piece of encrypted information contained in the authentication request transmitted from the attacker's apparatus to the authentication apparatus 2 is encrypted using a different common key. The authentication request contains the ID of the attacker's apparatus in cleartext, but it is assumed that the common key corresponding to the ID is not stored in the storage unit 22 of the authentication apparatus 2. Thus, each authentication request is received by the authentication apparatus 2 (step S201), but cannot be decrypted by the decrypting unit 23, and thus the decrypted information cannot be acquired (step S202). Accordingly, authentication using an authentication request containing encrypted information decrypted using a common key cannot be performed, and, as a result, it is not judged that the attacker's apparatus is a legitimate authentication-gaining apparatus 1. That is to say, the attacker's apparatus is not authenticated.

Repeated Transmission of One Authentication Request

Figure 6:
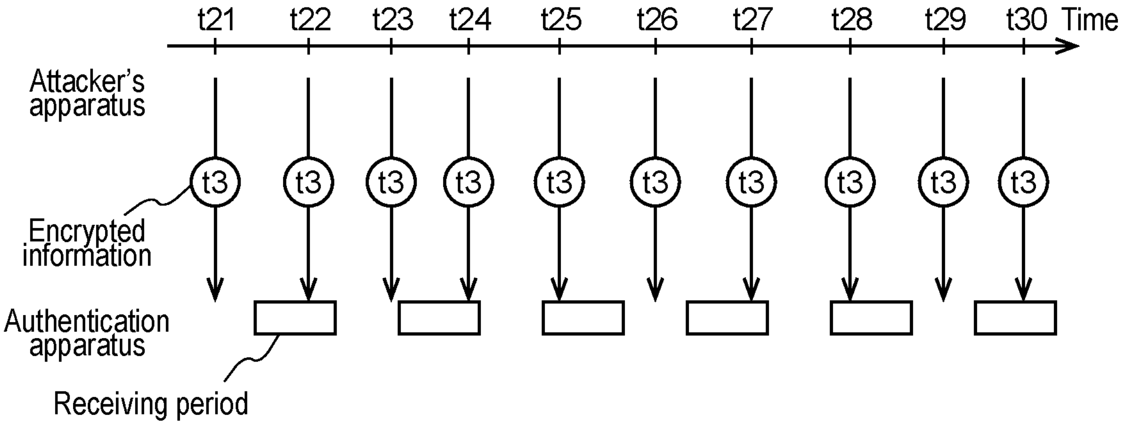
FIG. 6 is a chart illustrating transmitting and receiving of an authentication request according to the embodiment.

Hereinafter, a case will be described in which an attacker's apparatus that has received one barcode-like identifier-type authentication request transmitted from a legitimate authentication-gaining apparatus 1 repeatedly transmits the authentication request to the authentication apparatus 2. It is assumed that the attacker's apparatus receives an authentication request transmitted from a legitimate authentication-gaining apparatus 1 at a time t3, and, as shown in FIG. 6, repeatedly transmits the authentication request to the authentication apparatus 2 from a time t21 that is after the authentication period of the authentication request transmitted from the legitimate authentication-gaining apparatus 1 is ended. In this case, the encrypted information contained in the authentication request can be decrypted because it is encrypted using a common key of the legitimate authentication-gaining apparatus 1. Accordingly, the authentication requests respectively transmitted at times t22, t24, t25, t27, t28, and t30 shown in FIG. 6 are received by the receiving unit 21 of the authentication apparatus 2, encrypted information contained in the authentication requests is decrypted by the decrypting unit 23, and decrypted information after the decryption is accumulated in the storage unit 22 in association with the ID of the authentication-gaining apparatus 1 different from that of the attacker's apparatus, and the receiving times (steps S201 and S202).

Then, if authentication by the authentication unit 24 is started (step S203), it is judged that there are duplicates in the decrypted information because all pieces of decrypted information are the same, and it is judged that the attacker's apparatus is not a legitimate authentication-gaining apparatus 1 (step S209). In this manner, even when one legitimate authentication request is used for an attack, the attacker's apparatus is not authenticated. In this case, the decrypted information does not match the unique information, and, also from this aspect, it can be judged that the authentication-gaining apparatus 1 is not legitimate.

Later Transmission of Multiple Authentication Requests

Figure 7:
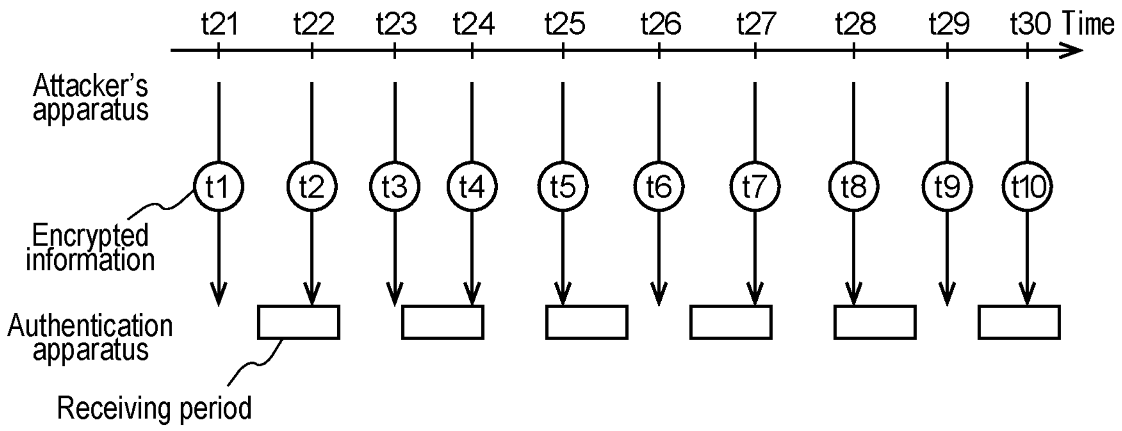
FIG. 7 is a chart illustrating transmitting and receiving of an authentication request according to the embodiment.

Hereinafter, a case will be described in which an attacker's apparatus that has received all barcode-like identifier-type authentication requests transmitted from a legitimate authentication-gaining apparatus 1 transmits the multiple authentication requests to the authentication apparatus 2. It is assumed that the attacker's apparatus receives authentication requests transmitted from a legitimate authentication-gaining apparatus 1 respectively at times t1 to t10, and, as shown in FIG. 7, transmits each of the multiple authentication requests to the authentication apparatus 2 at similar time intervals from a time t21 that is after the authentication period of the authentication requests transmitted from the legitimate authentication-gaining apparatus 1 is ended. In this case, the encrypted information contained in the authentication requests can be decrypted because it is encrypted using a common key of the legitimate authentication-gaining apparatus 1.

Accordingly, the authentication requests respectively transmitted at times t22, t24, t25, t27, t28, and t30 shown in FIG. 7 are received by the receiving unit 21 of the authentication apparatus 2, encrypted information contained in the authentication requests is decrypted by the decrypting unit 23, and decrypted information after the decryption is accumulated in the storage unit 22 in association with the ID of the authentication-gaining apparatus 1 different from that of the attacker's apparatus, and the receiving times (steps S201 and S202).

Then, authentication by the authentication unit 24 is started, and it is judged that there is no duplicate in the decrypted information, the number of times "6" that reception is performed is not more than the threshold "7", and the authentication request receiving intervals do not include a receiving interval with a probability that is lower than a threshold (step S203 to S206). However, in this case, it is assumed that the difference between the time contained in the decrypted information and the receiving time is larger than a predetermined threshold. Accordingly, since the multiple pieces of decrypted information do not match the unique information, the authentication unit 24 judges that the attacker's apparatus is not a legitimate authentication-gaining apparatus 1 (steps S207 and S209). In this manner, even when multiple legitimate authentication requests are used for an attack, the attacker's apparatus is not authenticated.

Relay Transmission of Received Authentication Requests

Figure 8:
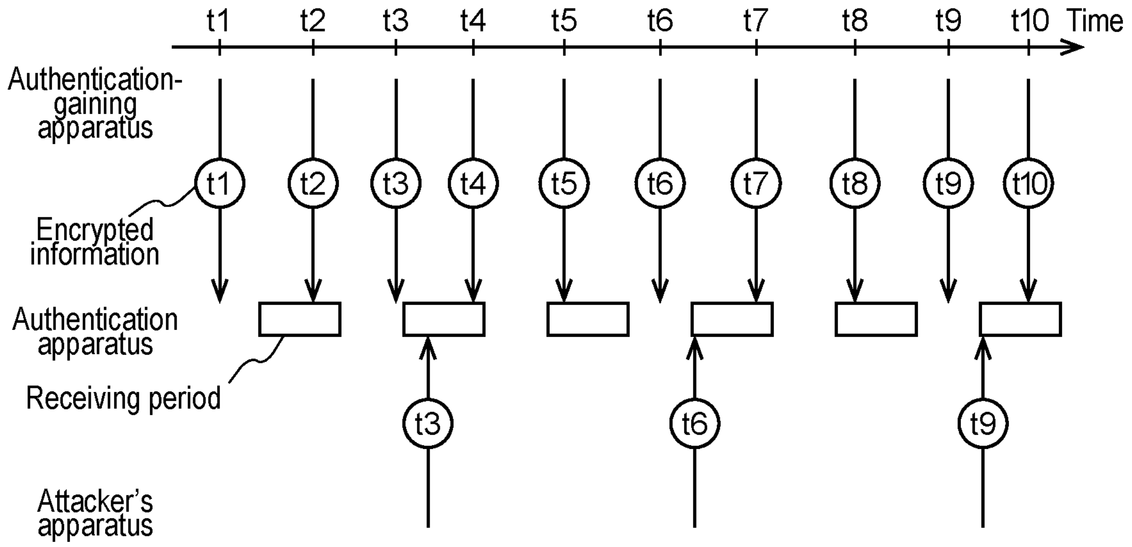
FIG. 8 is a chart illustrating transmitting and receiving of an authentication request according to the embodiment.

Hereinafter, a case will be described in which an attacker's apparatus that has received barcode-like identifier-type authentication requests transmitted from a legitimate authentication-gaining apparatus 1 immediately transmits the barcode-like identifier-type authentication requests to the authentication apparatus 2. It is assumed that the attacker's apparatus receives authentication requests transmitted from a legitimate authentication-gaining apparatus 1 at times t3, t6, and t9, and, as shown in FIG. 8, transmits the authentication requests to the authentication apparatus 2 through transferring (relaying). In this case, the encrypted information contained in the authentication requests from the attacker's apparatus can be decrypted, and thus the decrypted information after the decryption is accumulated in the storage unit 22 (steps S201 and S202).

In this example, as shown in FIG. 8, it is assumed that the attacker's apparatus transmitted, by chance, barcode-like identifier-type authentication requests that have not been received by the authentication apparatus 2, during receiving periods of the authentication apparatus 2. Thus, in the authentication processing, there is no duplicate in the decrypted information, and thus an unauthorized act cannot be detected based on duplicates (steps S203 and S204). Meanwhile, in this case, the authentication requests from the legitimate authentication-gaining apparatus 1 and the authentication requests from the attacker's apparatus are received by the authentication apparatus 2, and the number of times "9" that an authentication request is received is more than the threshold "7" (step S205). Accordingly, since the number of times that reception is performed is large, the authentication unit 24 can judge that the apparatuses that transmitted the authentication requests are not legitimate.

In FIG. 8, if the number of barcode-like identifier-type authentication requests that are transmitted from the attacker's apparatus is one, an unauthorized act cannot be detected based on the number of times that an authentication request is received being more than the threshold. Meanwhile, also in that case, the authentication request that is transmitted from the attacker's apparatus is transmitted after the authentication request that is transmitted from the legitimate authentication-gaining apparatus 1, and thus the receiving intervals of authentication requests received by the authentication apparatus 2 are different from those of authentication requests transmitted from a legitimate authentication-gaining apparatus 1, and, as a result, the receiving intervals are likely to include a receiving interval with a probability that is lower than a threshold. Accordingly, even in such a case, there is a possibility that the authentication unit 24 can judge that the apparatuses that transmitted the authentication requests are not legitimate, using the authentication request receiving intervals (step S206).

Furthermore, contrary to FIG. 8, if a barcode-like identifier-type authentication request transmitted from the attacker's apparatus has been already received by the authentication apparatus 2, there is a duplicate in the decrypted information, and thus the authentication unit 24 can judge that the apparatuses that transmitted the authentication requests are not legitimate (step S204).

Relay Transmission of Received Authentication Request to Different Place

Hereinafter, a case will be described in which an attacker's apparatus that has received a barcode-like identifier-type authentication request transmitted from a legitimate authentication-gaining apparatus 1 immediately transmits the authentication request via another attacker's apparatus to another authentication apparatus 2. This example is similar to the case in FIG. 8 in that an attacker's apparatus transfers an authentication request, but is different therefrom in that the authentication apparatus 2 to which the transferred authentication request is transmitted is different from the authentication apparatus 2 to which the authentication request of the legitimate authentication-gaining apparatus 1 was transmitted.

Figure 9:
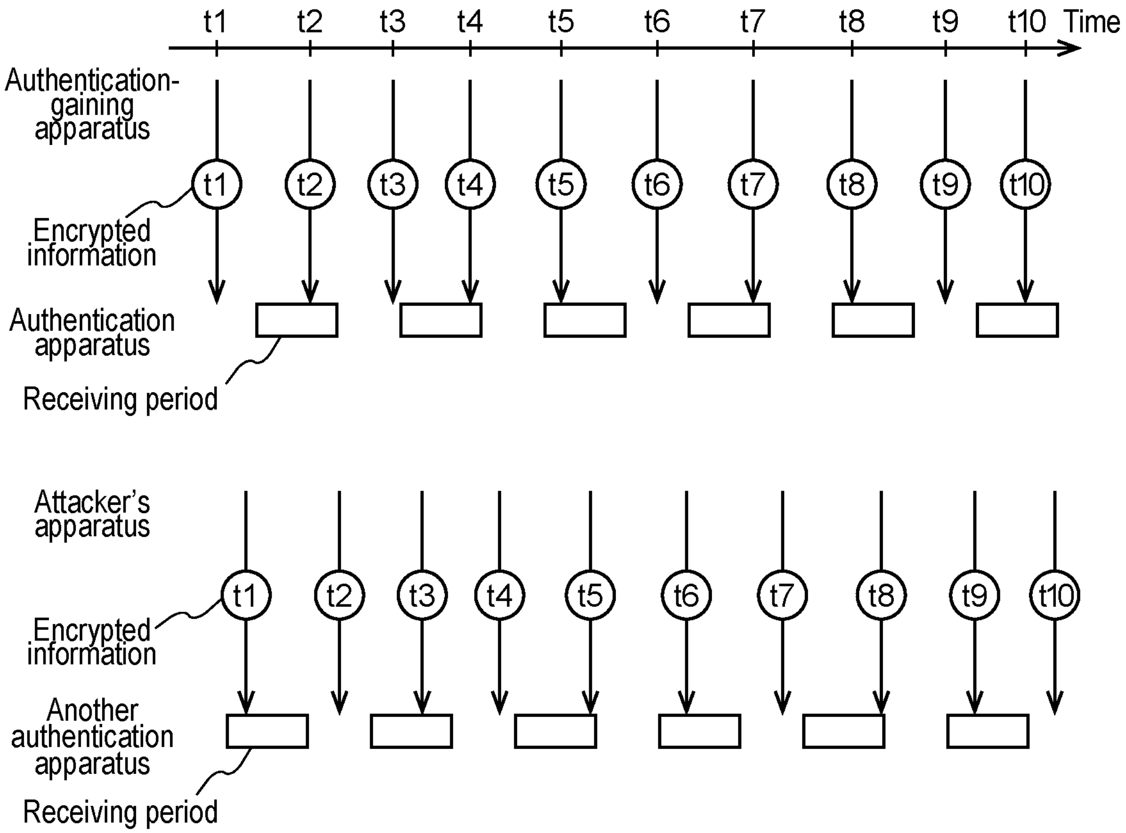
FIG. 9 is a chart illustrating transmitting and receiving of an authentication request according to the embodiment.

As shown in FIG. 9, it is assumed that a first attacker's apparatus at a first place receives a barcode-like identifier-type authentication request transmitted from a legitimate authentication-gaining apparatus 1, and immediately transmits the received authentication request to a second attacker's apparatus that is located at a second place, and the second attacker's apparatus at the second place immediately transmits the received authentication request to an authentication apparatus 2 that is different from an authentication apparatus 2 at the first place. In this case, an unauthorized act cannot be detected based on duplicates in the decrypted information or the number of times that reception is performed being large. Meanwhile, when an authentication request is transmitted from the first place to the second place, the receiving intervals of authentication requests that are received at the second place are different from the receiving intervals at the first place due to a variation in the transmission time. Accordingly, the receiving intervals of authentication requests at the second place are likely to include a receiving interval with a probability that is lower than a threshold, and, thus, using this aspect, there is a possibility that the authentication unit 24 of the authentication apparatus 2 that is located at the second place can judge that the apparatus that transmitted the authentication request at the second place is not legitimate (step S206).

Furthermore, assuming that the authentication unit 24 of the authentication apparatus 2 at the second place acquires, for multiple pieces of decrypted information, a time difference that is a difference between the time that is the decrypted information and the receiving time of the barcode-like identifier-type authentication request corresponding to the decrypted information, and judges that the multiple pieces of decrypted information do not match the unique information if the acquired multiple time differences are not constant, there is a possibility that it is judged that the multiple pieces of decrypted information do not match the unique information because the multiple time differences are not constant due to a variation in the transmission time, and, as a result, there is a possibility that it can be judged that the apparatus that transmitted the authentication request at the second place is not legitimate (step S207).

In order to detect an unauthorized act in which a barcode-like identifier-type authentication request acquired at a first place is used at a second place, it is also possible that the unique information may contain the positional information of the authentication-gaining apparatus 1. It is preferable that the positional information is positional information indicating the position of the authentication-gaining apparatus 1 when an authentication request containing encrypted information obtained by encrypting unique information containing the positional information is transmitted. As described above, the unique information may contain a unique portion and a non-unique portion, and the positional information of the authentication-gaining apparatus 1 may be contained as the non-unique portion. In this case, the authentication-gaining apparatus 1 may further include a position acquiring unit for acquiring positional information indicating the position of the authentication-gaining apparatus 1. The positional information may be, for example, latitude/longitude, or other coordinate values or the like indicating the position. For example, the position may be acquired by the position acquiring unit, by using wireless communication such as a method using a GPS (global positioning system), a method using an indoor GPS, or a method using the nearest radio base station, by using a measurement result of a distance to a near-by object as known in SLAM (simultaneous localization and mapping), by capturing an image of a near-by object as known in Visual-SLAM, or by using other methods for acquiring the position. In this case, if the positional information contained in the decrypted information is not within a predetermined range (e.g., within 20 meters, within 10 meters, within 5 meters, etc.) from the positional information of the authentication apparatus 2 that has received an authentication request, the authentication unit 24 of the authentication apparatus 2 may judge that the decrypted information does not match the unique information. In addition to this judgment, it is also possible to judge whether or not information corresponding to the unique portion contained in the decrypted information matches the unique portion of the unique information. Then, if it is judged that they do not match each other in any judgment, it can be judged that the authentication-gaining apparatus 1 that transmitted the authentication request is not legitimate. In this case, the authentication apparatus 2 may further include a position acquiring unit for acquiring positional information indicating the position of the authentication apparatus 2. Then, it may be judged whether or not the positional information contained in the decrypted information is within a predetermined range from the positional information of the authentication apparatus 2, using the positional information acquired by the position acquiring unit. The position acquiring unit included in the authentication apparatus 2 and the positional information acquired by the position acquiring unit are similar to those described above, and thus a description thereof has been omitted. Note that the authentication apparatus 2 may directly acquire the position of the authentication-gaining apparatus 1 using an input device such as a camera without using the decrypted information, or multiple authentication-gaining apparatuses 1 may be simultaneously authenticated. This allows for admission to large commercial facilities such as stadiums while presenting barcode-like identifiers at locations where their images can be easily captured, settlement of payments, and payment while entering the stadium.

Furthermore, even when the cryptographic key is not a common key, but a public key, unless an attacker knows the type of unique information, the attacker cannot generate unique information and perform encryption, and, as described above, all the attacker can do is copy and use a barcode-like identifier-type authentication request transmitted from a legitimate authentication-gaining apparatus 1. In such a situation, an unauthorized act can be detected as in the case in which a common key is used.

Furthermore, in a case in which there is a duplicate in the unique information acquired by the acquiring unit 11, as a result of which multiple barcode-like identifier-type authentication requests containing the same encrypted information are transmitted, as described above, if there are a predetermined number or more of duplicates in multiple pieces of decrypted information, the authentication unit 24 may judge that the authentication-gaining apparatus 1 is not legitimate. Specifically, if the unique information that is time is acquired every 50 milliseconds using a clock with a level of precision of 100 milliseconds, the number of duplicates in the unique information is two, and the value is different for each set of two pieces of unique information. Even in such a case, if three or more pieces of decrypted information are the same, it can be detected that an authentication request is transmitted also from an attacker. In the case in which the authentication apparatus 2 is performing intermittent reception, and, in this situation, only one of the two authentication requests corresponding to the same unique information, transmitted from the legitimate authentication-gaining apparatus 1, is received, if there is any duplicate in the multiple pieces of decrypted information, the authentication unit 24 can detect that an authentication request is transmitted also from an attacker.

Lastly, an example of an apparatus, a system, and the like implementing the authentication apparatus 2 according to this embodiment will be briefly described.

The authentication apparatus 2 may be built in an automatic ticket gate. The automatic ticket gate may periodically transmit a beacon that is an instruction to transmit a barcode-like identifier-type authentication request. Upon receipt of the transmission instruction that is the beacon, the authentication-gaining apparatus 1 of a user transmits multiple authentication requests to the authentication apparatus 2 of the automatic ticket gate as described above. If the authentication apparatus 2 judges that the authentication-gaining apparatus 1 is legitimate, using the multiple authentication requests, the automatic ticket gate opens, and the user can enter or exit the venue through the ticket gate. When the user enters or exits the venue through the ticket gate, payment from the user is made. In this manner, for example, the user can take trains and the like without operating a smartphone or the like that is the authentication-gaining apparatus 1.

The authentication apparatus 2 may be built in an automatic vending machine for drinks or the like. If a user operates a purchase button of the automatic vending machine, the automatic vending machine may transmit an instruction to transmit a barcode-like identifier-type authentication request. Upon receipt of the transmission instruction, the authentication-gaining apparatus 1 of the user transmits multiple authentication requests to the authentication apparatus 2 of the automatic vending machine as described above. If the authentication apparatus 2 judges that the authentication-gaining apparatus 1 is legitimate, using the multiple authentication requests, a product such as a drink according to the purchase button that was operated by the user comes out of the automatic vending machine, and the user can receive the product. According to the processing, payment from the user is made as appropriate. In this manner, for example, the user can purchase products from the automatic vending machine without operating a smartphone or the like that is the authentication-gaining apparatus 1.

The authentication apparatus 2 may be arranged near the entrance to the venue of an event such as a concert, a sport match, or a seminar, an art gallery, a museum, a theme park, a gym, a members-only lounge, or the like. In this case, a common key may be used as a ticket for an event or the like, or a membership card. The authentication apparatus 2 may periodically transmit a beacon that is an instruction to transmit a barcode-like identifier-type authentication request. Upon receipt of the transmission instruction that is the beacon, the authentication-gaining apparatus 1 of a user transmits multiple authentication requests to the authentication apparatus 2 arranged near the entrance to the venue as described above. If the authentication apparatus 2 judges that the authentication-gaining apparatus 1 is legitimate, using the multiple authentication requests, for example, the authentication apparatus 2 may specify the position of the authentication-gaining apparatus 1 using the intensity of radio waves or the like of the authentication requests, and perform output such that information on a ticket or the like corresponding to the common key (e.g., information on the ticket type, information on a ticket holder registered in advance, etc.) is displayed the specified position. A staff member of the event or the like who looks at the display can specify a person who does not hold a ticket or a membership card, out of the people coming into the venue from the entrance. A staff member may ask a person who does not hold a ticket or the like to present a ticket or the like. In this manner, for example, users can enter event venues, art galleries, gyms, and the like without operating a smartphone or the like that is the authentication-gaining apparatus 1.

The authentication apparatus 2 may be built in a cash register of a shop. For example, if a user or a shop clerk operates a payment button of the cash register, the cash register may transmit an instruction to transmit an authentication request. Upon receipt of the transmission instruction, the authentication-gaining apparatus 1 of the user transmits multiple authentication requests to the authentication apparatus 2 of an automatic vending machine as described above. If the authentication apparatus 2 judges that the authentication-gaining apparatus 1 is legitimate, using the multiple authentication requests, payment according to the purchase prices may be made from a payment part (e.g., a credit card, electronic money, etc.) registered in association with the common key, and the user may receive purchased items such as products. In this manner, for example, the user can purchase products and the like at shops without operating a smartphone or the like that is the authentication-gaining apparatus 1.

Furthermore, the authentication-gaining apparatus 1 and the authentication apparatus 2 according to this embodiment can be used in situations other than those described above. For example, they can be used in authentication for car sharing, car rental, airplane boarding procedures, or the like. For example, they can be used in identity verification when operating a device such as a personal computer.

As described above, with the authentication-gaining apparatus 1 and the barcode-like identifier-type authentication request transmitting method according to this embodiment, it is possible to transmit multiple authentication requests containing encrypted information obtained by encrypting unique information, to the authentication apparatus 2. For example, if encryption is performed using a common key, it is possible to perform encryption at higher speed. If the unique information contains random number values, counter values, time, or the like, there is an advantage in that unique information can be generated at low load. If such unique information is used, the amount of unique information can be reduced, and, as a result, the amount of information contained in the authentication request can be reduced. In addition, authentication can be performed at high speed without the need for online authentication each time authentication is performed, as is the case with conventional two-dimensional barcodes and credit card authentication. Accordingly, for example, it is possible to transmit an authentication request even according to a communication standard with a limited payload length such as barcodes. As described above, it is possible to perform authentication without operations by users, and thus it is possible to improve the usability for users.

Furthermore, with the authentication apparatus 2 and the authentication method according to this embodiment, it is possible to realize secure authentication through simple processing, by using multiple barcode-like identifier-type authentication requests transmitted from the authentication-gaining apparatus 1. If encrypted information is information in which unique information is encrypted using a common key, it is possible to perform processing that decrypts the encrypted information, at high speed. If a common key is not leaked or if the type of unique information is not known, all an attacker's apparatus can do is make an attack by transmitting an authentication request received from a legitimate authentication-gaining apparatus 1, to the authentication apparatus 2. Accordingly, it is possible to detect whether or not an attacker's apparatus is included in those from which authentication requests were transmitted, through simple processing, for example, such as judgment processing as to whether or not there are a predetermined number or more of duplicates in multiple pieces of decrypted information, judgment processing as to whether or not the number of times that reception is performed during a predetermined period is more than a threshold, judgment processing as to whether or not authentication request receiving intervals include an interval with a probability that is lower than a threshold, or judgment processing as to whether or not decrypted information acquired from an authentication request matches the unique information. In this manner, it is possible to deal with spoofing attacks, and to realize secure authentication. Since it is judged whether or not an authentication-gaining apparatus 1 is legitimate, using multiple authentication requests, even an unauthorized act that cannot be detected only with one authentication request can be detected, and thus it is possible to improve the security. Also in the case in which the authentication apparatus 2 intermittently receives an authentication request as in the case of cameras, it is possible to properly perform the above-described authentication. With such intermittent reception of authentication requests, the limitations of the specifications in the authentication apparatus 2 can be reduced.

In this embodiment, the case was described in which the authentication unit 24 judges whether or not an authentication-gaining apparatus 1 is legitimate, through judgment regarding duplicates in the decrypted information, judgment regarding the number of times that a barcode-like identifier-type authentication request is received, judgment regarding authentication request receiving intervals, and judgment regarding whether or not the decrypted information matches the unique information, but the authentication unit 24 may judge whether or not an authentication-gaining apparatus 1 is legitimate, through at least any one or more of the judgments.

For example, if a common key is used for only a single time of authentication (e.g., if a common key corresponds to an admission ticket or the like, etc.), and barcode-like identifier-type authentication requests that are transmitted contain encrypted information obtained by encrypting unique information that is different for each authentication request, the authentication unit 24 may judge whether or not an authentication-gaining apparatus 1 is legitimate, only by judging whether or not there is a duplicate in the decrypted information. The reason for this is that, in such a case, an attacker's apparatus cannot use an authentication request transmitted from a legitimate authentication-gaining apparatus 1, at another place or another opportunity, and, if an authentication request transmitted from an attacker's apparatus is received by the authentication apparatus 2, there will be duplicates in the multiple pieces of decrypted information.

Furthermore, for example, if a common key is used for only a single time of authentication, the authentication unit 24 may judge whether or not an authentication-gaining apparatus 1 is legitimate, only by judging whether or not the number of times that a barcode-like identifier-type authentication request is received during a predetermined period is more than a threshold. The reason for this is that, in such a case, an attacker's apparatus cannot use an authentication request transmitted from a legitimate authentication-gaining apparatus 1, at another place or another opportunity, and, if an authentication request transmitted from an attacker's apparatus is received by the authentication apparatus 2, the number of times that reception is performed will be more than a predetermined number of times.

Furthermore, for example, even in the case in which reception of a barcode-like identifier-type authentication request is not intermittently but successively performed, wherein a common key is used for only a single time of authentication and authentication request transmitting intervals from a legitimate authentication-gaining apparatus 1 are predetermined, the authentication unit 24 may judge whether or not an authentication-gaining apparatus 1 is legitimate, only by judging whether or not authentication request receiving intervals in the authentication period include a receiving interval with a probability that is lower than a threshold. The reason for this is that, in such a case, an attacker's apparatus cannot use an authentication request transmitted from a legitimate authentication-gaining apparatus 1, at another place or another opportunity, and, if an authentication request is transmitted from an attacker's apparatus, the authentication request receiving intervals will include a receiving interval that is different from typical intervals, that is, a receiving interval with a probability that is lower than a threshold.

Furthermore, for example, if a common key is used for only a single time of authentication, the authentication unit 24 may judge whether or not an authentication-gaining apparatus 1 is legitimate, only by judging whether or not the multiple pieces of decrypted information match the unique information. The reason for this is that, in such a case, an attacker's apparatus cannot use an authentication request transmitted from a legitimate authentication-gaining apparatus 1, at another place or another opportunity, and, if an authentication request transmitted from an attacker's apparatus is received by the authentication apparatus 2, the multiple pieces of decrypted information will not match the unique information.

Furthermore, in the foregoing embodiment, the case was mainly described in which authentication processing is performed without a user's operation between the authentication-gaining apparatus 1 and the authentication apparatus 2, but there is no limitation to this. For example, the authentication-gaining apparatus 1 may start to transmit a barcode-like identifier-type authentication request according to a user's operation.

Furthermore, in the foregoing embodiment, for example, the authentication-gaining apparatus 1 may be held by a user, or mounted in a movable body. In the case of the latter, for example, it is also possible to perform authentication regarding the movable body. The movable body may be, for example, a traveling body that travels or a flying body that flies.

Furthermore, in the foregoing embodiment, each process or each function may be realized as centralized processing using a single apparatus or a single system, or may be realized as distributed processing using multiple apparatuses or multiple systems.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown storage medium temporarily or for a long period of time even if not specified in the description above. Furthermore, the information may be accumulated in the unshown storage medium by each constituent element or by an unshown accumulating unit. Furthermore, the information may be read from the unshown storage medium by each constituent element or by an unshown reading unit.

Furthermore, in the foregoing embodiment, if information used in each constituent element or the like, for example, information such as a threshold value, an address, or various setting values used in each constituent element in the processing may be changed by a user, and the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The change instruction may be accepted by the unshown accepting unit, for example, by accepting information from an input device, by receiving information transmitted via a communication line, or by accepting information read from a predetermined storage medium.

Furthermore, in the foregoing embodiment, if two or more constituent elements included in the authentication-gaining apparatus 1 have a communication device, an input device, or the like, the two or more constituent elements may have a physically single device, or may have different devices. The same applies to the authentication apparatus 2.

Furthermore, in the foregoing embodiment, each constituent element may be configured by dedicated hardware, or alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing the storage unit or the storage medium. Software that realizes the authentication-gaining apparatus 1 according to the foregoing embodiment is a program as follows. Specifically, this program is a program for causing a computer to execute: a step of acquiring unique information; a step of encrypting the unique information using a cryptographic key, thereby generating encrypted information; and a step of repeatedly transmitting a barcode-like identifier-type authentication request containing the encrypted information, to an authentication apparatus, during an authentication period, wherein multiple authentication requests respectively containing encrypted information obtained by encrypting different pieces of unique information are transmitted during the authentication period.

Software that realizes the authentication apparatus 2 according to the foregoing embodiment is a program as follows. Specifically, this program is a program for causing a computer to execute: a step of repeatedly receiving a barcode-like identifier-type authentication request containing encrypted information obtained through encryption using a cryptographic key and transmitted from an authentication-gaining apparatus, during an authentication period; a step of decrypting the encrypted information, thereby acquiring decrypted information; and a step of judging whether or not the authentication-gaining apparatus is legitimate, using multiple authentication requests received during the authentication period and containing encrypted information that has been decrypted; and a step of outputting a judgment result in the step of judging whether or not the authentication-gaining apparatus is legitimate, wherein the authentication-gaining apparatus that is legitimate transmits multiple authentication requests respectively containing encrypted information obtained by encrypting different pieces of unique information, during the authentication period.

It should be noted that, in the programs, in a step of transmitting information, a step of receiving information, a step of outputting information, or the like, at least processing that can be performed only by hardware, for example, processing that is performed by a modem or an interface card in the transmitting step or the receiving step is not included.

Furthermore, this program may be executed by downloading from a server or the like, or may be executed by reading a program stored in a predetermined storage medium (e.g., an optical disk such as a CD-ROM, a magnetic disk, a semiconductor memory, etc.). Furthermore, the program may be used as a program for constituting a program product.

Furthermore, a computer that executes the program may be a single computer or may be multiple computers. That is to say, centralized processing may be performed, or distributed processing may be performed.

Figure 10:
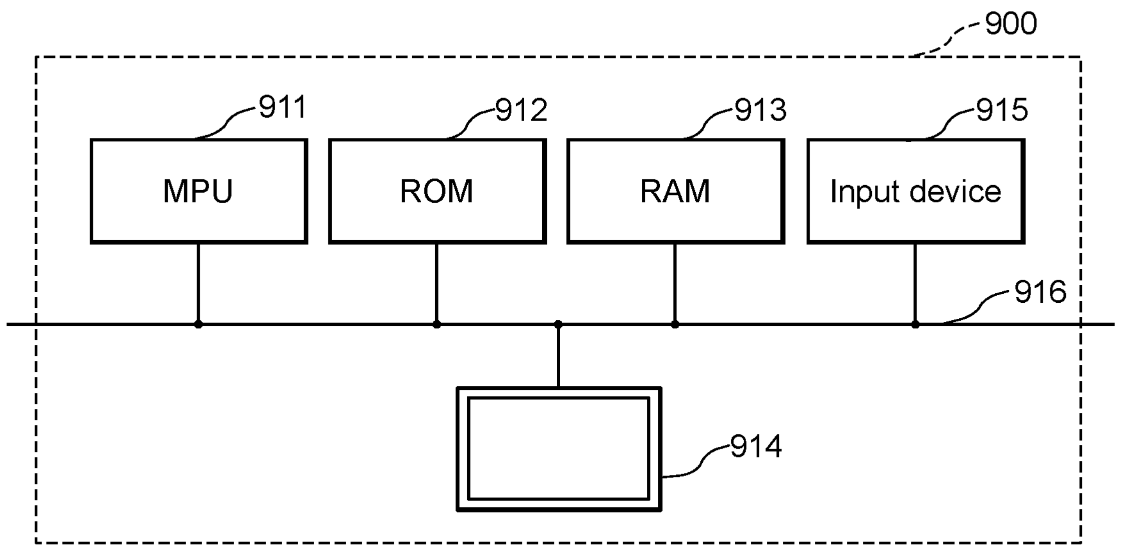
FIG. 10 is a diagram showing an example of the configuration of a computer system according to the embodiment.

FIG. 10 is a view showing an example of a computer system 900 that executes the above-described programs to realize the authentication-gaining apparatus 1 and the authentication apparatus 2 according to the foregoing embodiment. The foregoing embodiments may be realized using computer hardware and computer programs executed thereon. The above program may be realized as multiple modularized programs, or as a single program by combining two or more programs.

In FIG. 10, the computer system 900 includes an MPU (micro processing unit) 911, a ROM 912 such as a flash memory in which a program such as a boot up program, an application program, a system program, and data are to be stored, an RAM 913 that is connected to the MPU 911 and in which a command of an application program is temporarily stored and a temporary storage area is provided, a touch panel 914, an input device 915, and a bus 916 that connects the MPU 911, the ROM 912, and the like. The input device 915 is a camera, a microphone, a speaker, a barcode reader, or the like. Note that a wireless communication module or a wired communication module may be included. Instead of the touch panel 914, a display may be included.

The program for causing the computer system 900 to execute the functions of the authentication-gaining apparatus 1 and the authentication apparatus 2 according to the foregoing embodiment may be stored in the ROM 912 via the wireless communication module. The program is loaded into the RAM 913 at the time of execution. The program may be loaded directly from a network.

The program does not necessarily have to include, for example, an operating system (OS) or a third party program to cause the computer system 900 to execute the functions of the authentication-gaining apparatus 1 and the authentication apparatus 2 according to the foregoing embodiment. The program may only include a command portion to call an appropriate function or module in a controlled mode and obtain desired results. The manner in which the computer system 900 operates is well known, and thus a detailed description thereof has been omitted.

The present invention is not limited to the embodiment set forth herein. Various modifications are possible within the scope of the present invention. The barcode-like identifier does not have to be an image, but can be a signal using radio waves or magnetism, a flickeringlight signal, a sound wave signal, or any other signal that can be transmitted, in which case the image in the present embodiment may be read as a signal.

As described above, the authentication-gaining apparatus, the authentication apparatus, the authentication request transmitting method, the authentication method, and the program according to the present invention can be used, for example, in authentication for payment at cash registers, automatic ticket gates, and the like, and for presentation of tickets, and the like.

The invention claimed is:

1. An authentication-gaining apparatus comprising:

an acquiring unit that generates unique information containing time;

an encrypting unit that encrypts the unique information using a cryptographic key, thereby generating encrypted information; and a display unit that repeatedly displays an authentication request containing the encrypted information so as to allow an authentication apparatus to read the authentication request, during an authentication period, wherein the authentication request is a display image, wherein, for each of a plurality of authentication requests displayed during the authentication period, the acquiring unit generates mutually different respective unique information;

the encrypting unit encrypts the respective unique information to generate corresponding encrypted information; and the display unit displays, during the authentication period, the plurality of authentication requests each containing the corresponding encrypted information;

wherein the plurality of authentication requests displayed during the authentication period are used for making a single judgment of whether or not the authentication gaining apparatus is legitimate.

2. An authentication apparatus comprising:

a receiving unit comprising at least one camera configured to repeatedly read, during an authentication period, an authentication request containing encrypted information obtained through encryption using a cryptographic key and displayed by an authentication-gaining apparatus;

a decrypting unit comprising at least one processor configured to decrypt the encrypted information, thereby acquiring decrypted information;

an authentication unit comprising the at least one processor configured to judge whether or not the authentication-gaining apparatus is legitimate, using multiple authentication requests read during the authentication period and containing encrypted information that has been decrypted; and an output unit that outputs a judgment result by the authentication unit, wherein the authentication unit acquires multiple time differences of the multiple authentication requests read during the authentication period, and judges that the authentication-gaining apparatus is not legitimate in a case in which the acquired multiple time differences are not constant, each of the time differences being a difference between the time contained in decrypted information acquired from an authentication request and the reading time of the authentication request.

3. The authentication apparatus according to claim 2, wherein, in a case in which a difference between the time contained in at least one piece of decrypted information out of the multiple pieces of decrypted information respectively acquired from the multiple authentication requests read during the authentication period and the reading time of the authentication request corresponding to the decrypted information is larger than a threshold, the authentication unit judges that the authentication-gaining apparatus is not legitimate.

4. The authentication apparatus according to claim 2, wherein the receiving unit intermittently reads an authentication request.

5. The authentication apparatus according to claim 2, wherein the authentication request is an image.

6. An authentication request displaying method comprising:

for each of a plurality of authentication requests to be displayed during an authentication period:

a step of generating mutually different respective unique information containing time;

a step of encrypting the respective unique information using a cryptographic key, thereby generating corresponding encrypted information; and a step of displaying the authentication request containing the corresponding encrypted information so as to allow an authentication apparatus to read the authentication request, during the authentication period, wherein the authentication request is a display image, wherein the plurality of authentication requests displayed during the authentication period are used for making a single judgment of whether or not the authentication gaining apparatus is legitimate.

7. An authentication method comprising:

a step of repeatedly reading an authentication request containing encrypted information obtained through encryption using a cryptographic key and displayed by an authentication-gaining apparatus, during an authentication period;

a step of decrypting the encrypted information, thereby acquiring decrypted information;

a step of judging whether or not the authentication-gaining apparatus is legitimate, using multiple authentication requests read during the authentication period and containing encrypted information that has been decrypted; and a step of outputting a judgment result in the step of judging whether or not the authentication-gaining apparatus is legitimate, wherein, in the step of judging whether or not the authentication-gaining apparatus is legitimate, multiple time differences of the multiple authentication requests read during the authentication period are acquired, and it is judged that the authentication-gaining apparatus is not legitimate in a case in which the acquired multiple time differences are not constant, each of the time differences being a difference between the time contained in decrypted information acquired from an authentication request and the reading time of the authentication request.

8. A non-transitory computer-readable storage medium storing a program for causing a computer to execute:

for each of a plurality of authentication requests to be displayed during an authentication period:

a step of generating mutually different respective unique information containing time;

a step of encrypting the respective unique information using a cryptographic key, thereby generating corresponding encrypted information; and a step of displaying the authentication request containing the corresponding encrypted information so as to allow an authentication apparatus to read the authentication request, during the authentication period, wherein the authentication request is a display image, wherein the plurality of authentication requests displayed during the authentication period are used for making a single judgment of whether or not the authentication gaining apparatus is legitimate.

9. A non-transitory computer-readable storage medium storing a program for causing a computer to execute:

a step of repeatedly reading an authentication request containing encrypted information obtained through encryption using a cryptographic key and displayed by an authentication-gaining apparatus, during an authentication period;

a step of decrypting the encrypted information, thereby acquiring decrypted information;

a step of judging whether or not the authentication-gaining apparatus is legitimate, using multiple authentication requests read during the authentication period and containing encrypted information that has been decrypted; and a step of outputting a judgment result in the step of judging whether or not the authentication-gaining apparatus is legitimate, wherein, in the step of judging whether or not the authentication-gaining apparatus is legitimate, multiple time differences of the multiple authentication requests read during the authentication period are acquired, and it is judged that the authentication-gaining apparatus is not legitimate in a case in which the acquired multiple time differences are not constant, each of the time differences being a difference between the time contained in decrypted information acquired from an authentication request and the reading time of the authentication request.

* * * * *